United States Patent
Winkie et al.

(10) Patent No.: US 8,568,573 B2
(45) Date of Patent: Oct. 29, 2013

(54) APPARATUS AND METHOD FOR TREATING AQUEOUS SOLUTIONS AND CONTAMINANTS THEREIN

(71) Applicant: AquaMost, Inc., Madison, WI (US)

(72) Inventors: Douglas S. Winkie, Madison, WI (US); Terence P. Barry, Middleton, WI (US)

(73) Assignee: AquaMost, Inc., Madison, WI (US)

( * ) Notice: Subject to any disclaimer, the term of this patent is extended or adjusted under 35 U.S.C. 154(b) by 0 days.

(21) Appl. No.: 13/769,741

(22) Filed: Feb. 18, 2013

(65) Prior Publication Data

US 2013/0175162 A1 Jul. 11, 2013

Related U.S. Application Data

(63) Continuation of application No. 13/544,721, filed on Jul. 9, 2012, now Pat. No. 8,398,828.

(60) Provisional application No. 61/613,357, filed on Mar. 20, 2012, provisional application No. 61/583,974, filed on Jan. 6, 2012.

(51) Int. Cl.
  *C25F 7/00* (2006.01)
  *C02F 1/461* (2006.01)

(52) U.S. Cl.
  USPC .......... 204/253; 204/267; 205/340; 205/628; 205/637; 205/740

(58) Field of Classification Search
  USPC .......... 204/253, 267; 205/340, 628, 637, 740
  See application file for complete search history.

(56) References Cited

U.S. PATENT DOCUMENTS

| | | |
|---|---|---|
| 4,042,758 A | 8/1977 | Weinstein et al. |
| 4,181,593 A | 1/1980 | McKinzie et al. |
| 4,349,765 A | 9/1982 | Brandli |
| 4,471,036 A | 9/1984 | Skotheim |
| 4,521,499 A | 6/1985 | Switzer |
| 4,592,807 A | 6/1986 | Switzer |
| 4,793,910 A | 12/1988 | Smotkin et al. |
| 5,022,970 A | 6/1991 | Cook |
| 5,035,784 A | 7/1991 | Anderson |
| 5,137,607 A | 8/1992 | Anderson et al. |
| 5,215,943 A | 6/1993 | Anderson et al. |

(Continued)

FOREIGN PATENT DOCUMENTS

| | | |
|---|---|---|
| CA | 2632788 A1 | 11/2009 |
| CN | 2558656 Y | 6/2002 |

(Continued)

OTHER PUBLICATIONS

Translated Abstract for KR1020040066971 published Jul. 30, 2004, to Kim et al.

(Continued)

*Primary Examiner* — Nicholas A Smith
(74) *Attorney, Agent, or Firm* — Boardman & Clark LLP

(57) ABSTRACT

The present disclosure is generally directed to devices and methods of treating aqueous solutions to help remove or otherwise reduce levels, concentrations or amounts of one or more contaminants. The present disclosure relates to an apparatus comprising spaced-apart electrode structural support members extending from a first sidewall to a second sidewall, the spaced-apart electrode structural support members each having at least one photoelectrode and counterelectrode coupled to respective terminals adapted to be electrically coupled to a power supply, and at least one ultraviolet light source between the spaced-apart electrode support members.

20 Claims, 7 Drawing Sheets

(56) References Cited

U.S. PATENT DOCUMENTS

| | | | |
|---|---|---|---|
| 5,227,342 | A | 7/1993 | Anderson |
| 5,308,454 | A | 5/1994 | Anderson et al. |
| 5,439,624 | A | 8/1995 | Anderson |
| 5,543,034 | A | 8/1996 | Hilbertz |
| 5,603,843 | A | 2/1997 | Snee |
| 5,616,152 | A | 4/1997 | Velasquez |
| 5,622,791 | A | 4/1997 | Shackle |
| 5,712,037 | A | 1/1998 | Anderson |
| 5,932,111 | A | 8/1999 | Christensen et al. |
| 5,935,522 | A | 8/1999 | Swerdlow et al. |
| 5,963,417 | A | 10/1999 | Anderson et al. |
| 6,074,072 | A | 6/2000 | Parsons |
| 6,136,186 | A | 10/2000 | Gonzalez-Martin et al. |
| 6,159,421 | A | 12/2000 | Fujii |
| 6,180,014 | B1 | 1/2001 | Salama |
| 6,218,035 | B1 | 4/2001 | Fuglevand et al. |
| 6,261,464 | B1 | 7/2001 | Herrington et al. |
| 6,379,560 | B1 | 4/2002 | Tilp |
| 6,409,893 | B1 | 6/2002 | Holzbock |
| 6,409,928 | B1 | 6/2002 | Gonzalez et al. |
| 6,524,447 | B1 | 2/2003 | Carmignani et al. |
| 6,547,951 | B1 | 4/2003 | Maekawa |
| 6,645,366 | B2 | 11/2003 | Iseki et al. |
| 7,008,473 | B2 | 3/2006 | Butters |
| 7,230,255 | B2 | 6/2007 | Shim |
| 7,326,330 | B2 | 2/2008 | Herrington et al. |
| 7,425,272 | B2 | 9/2008 | Butters et al. |
| 8,398,828 | B1 | 3/2013 | Winkie |
| 2001/0042682 | A1 | 11/2001 | Weres et al. |
| 2002/0185080 | A1 | 12/2002 | Ortiz |
| 2004/0020861 | A1 | 2/2004 | Lehmann et al. |
| 2004/0022700 | A1 | 2/2004 | Kim et al. |
| 2005/0014066 | A1 | 1/2005 | Shimamune |
| 2005/0249659 | A1 | 11/2005 | Flynn et al. |
| 2006/0123885 | A1 | 6/2006 | Yates et al. |
| 2006/0144700 | A1 | 7/2006 | Carson et al. |
| 2007/0020158 | A1 | 1/2007 | Hashimoto et al. |
| 2007/0131621 | A1 | 6/2007 | Denton |
| 2007/0251811 | A1 | 11/2007 | Sahle-Demessie et al. |
| 2008/0050471 | A1 | 2/2008 | Omasa |
| 2008/0121531 | A1 | 5/2008 | Anderson et al. |
| 2009/0130748 | A1 | 5/2009 | Uphoff |
| 2009/0154060 | A1 | 6/2009 | Anderson et al. |
| 2009/0314711 | A1 | 12/2009 | Barry et al. |
| 2009/0320894 | A1 | 12/2009 | Angluli et al. |
| 2010/0201239 | A1 | 8/2010 | Mostoller et al. |
| 2010/0209294 | A1 | 8/2010 | Owen et al. |
| 2010/0270167 | A1 | 10/2010 | McFarland |
| 2010/0294726 | A1 | 11/2010 | Butters et al. |
| 2011/0180423 | A1 | 7/2011 | Barry et al. |
| 2012/0031852 | A1 | 2/2012 | Aglietto |

FOREIGN PATENT DOCUMENTS

| | | |
|---|---|---|
| CN | 1538939 A | 8/2002 |
| CN | 201031159 Y | 3/2007 |
| CN | 101033105 A | 9/2007 |
| CN | 101172674 A | 10/2007 |
| CN | 100558652 C | 11/2007 |
| CN | 101219371 A | 7/2008 |
| CN | 101543771 A | 9/2009 |
| CN | 101584996 A | 11/2009 |
| CN | 101913678 A | 8/2010 |
| CN | 101863548 A | 10/2010 |
| DE | 19602947 A1 | 1/1996 |
| EP | 2394963 A1 | 12/2011 |
| JP | 7-39273 | 2/1995 |
| JP | 2000-201569 A | 7/2000 |
| JP | 2000-210570 A | 8/2000 |
| JP | 2001-29747 A | 2/2001 |
| JP | 2001-62469 A | 3/2001 |
| JP | 2001-136862 A | 5/2001 |
| JP | 2001-170204 A | 6/2001 |
| JP | 2002-59177 A | 2/2002 |
| JP | 2003-190777 A | 7/2003 |
| JP | 2003-200043 A | 7/2003 |
| JP | 2003-200178 A | 7/2003 |
| JP | 2004-154742 A | 6/2004 |
| JP | 2005-152815 A | 6/2005 |
| JP | 2005-193216 A | 7/2005 |
| JP | 2006-61886 A | 3/2006 |
| JP | 2006-230345 | 9/2006 |
| JP | 2006-526500 A | 11/2006 |
| JP | 2007-69124 A | 3/2007 |
| JP | 2007-167029 A | 7/2007 |
| JP | 2011-55795 A | 3/2011 |
| KR | 10-2010-0003902 | 1/2010 |
| KR | 20-2011-0010953 | 11/2011 |
| WO | WO 2006/027659 | 3/2006 |

OTHER PUBLICATIONS

Amendment and Response to Office Action dated Nov. 1, 2011 for U.S. Appl. No. 12/369,219.

USPTO Final Office Action dated Nov. 1, 2011 for U.S. Appl. No. 12/369,219.

Amendment and Response to Office Action dated Jun. 16, 2011 for U.S. Appl. No. 12/369,219.

USPTO Nonfinal Office Action dated Jun. 16, 2011 for U.S. Appl. No. 12/369,219.

USPTO Nonfinal Office Action dated Feb. 25, 2013 for U.S. Appl. No. 12/977,347.

Amendment and Response to Office Action dated Feb. 25, 2013 for U.S. Appl. No. 12/977,347.

International Search Report and Written Opinion of the International Searching Authority dated Feb. 6, 2013 received in PCT/US12/67083 filed Nov. 29, 2012.

International Search Report and Written Opinion of the International Searching Authority dated Feb. 15, 2013 received in PCT/US13/20308 filed Jan. 4, 2013.

Abeysinghe et al., 1996, Biofilters for Water Reuse in Aquaculture, Water Sci. Technol. 34:253-260.

Asadi et al., 2006, Degradation of Aqueous Methyl tert-Butyl Ether by Photochemical, Biological, and Their Combined Processes, Int'l. Journal of Photoenergy, 2006: 1-7.

Baram et al., 2009, Enhanced inactivation of $E.$ $coli$ bacteria using immobilized porous $TiO_2$ photoelectrocatalysis, Electrochimica Acta 54 (2009) 3381-3386.

Barreto et al., 1995, Photocatalytic Degradation of Methyl-tert-Butyl Ether in $TiO_2$ Slurries: A Proposed Reaction Scheme, Wat. Res. vol. 29, No. 5, pp. 1243-1248.

Bradley et al., 1999, Aerobic Mineralization of MTBE and tert-Butyl Alcohol by Stream-Bed Sediment Microorganisms, Environ. Sci. Technol. 33:1877-1879.

Candal et al., 1998, $TiO_2$-Mediated Photoelectrocatalytic Purification of Water, J. Adv. Oxid. Technol. vol. 3, No. 3, pp. 270-276.

Candal et al., 1999, Titanium-Supported Titania Photoelectrodes Made by Sol-Gel Processes, J. of Env. Engin., October, pp. 906-912.

Candal et al., 2000, Effects of pH & Applied Pot. on Photocurrent and Oxid. Rate of Saline Solns. of Formic Acid in a Photoelectrocat. Reactor, Env. Sci. Tech. 34:3443-3451.

Cater et al., 2000, $UV/H_2O_2$ Treatment of Methyl tert-Butyl Ether in Contaminated Waters, Environ. Sci. Technol. 34: 659-662.

Chang et al., 2000, Kinetics of Methyl Tert-Butyl Ether Degradation & By-Product Formation During UV/Hydrogen Peroxide Water Treatment, Water Res. vol. 34, No. 8,p. 2223-2340.

Chen, 2004, Electrochemical Technologies in Wastewater Treatment, Sep. Purif. Technol. 38:11-41.

Cheng et al., 2007, Models of Hypochlorite production in electrochemical reactors with plate and porous anodes, J Appl Electrochem 37:1203-1217.

Chiang et al., 1996, Photodegradation of Chlorinated Organic Wastes with n-$TiO_2$ Promoted by P—CuO, Journal of the Chinese Chemical Society, 43: 21-27.

Chiang et al., 1995, Indirect Oxidation Effects in Electrochemical Oxidation Treatment of Landfill Leachate, Water Res. 29:671-678.

(56) References Cited

OTHER PUBLICATIONS

Cho et al., 2008, Meas. of OH radical CT for inactivating *Cryptosporidium parvum* using photo/ferrioxalate and photo/TiO2 systems, Jrnl. of Applied Microbiology, 104: 759-766.
Cho et al., 2010, Mechanisms of *Escherichia coli* inactivation by several disinfectants, Water Research 44: 3410-3418.
Christensen et al., 2003, Photoelectrocatalytic and photocatalytic disinfection of *E. coli* suspensions by titanium dioxide, Applied Catalysis B: Environmental 41: 371-386.
Church et al., 1997, Method for Determination of Methyl tert-Butyl Ether and Its Degradation Products in Water, Environmental Science & Technology, 31: 3723-3726.
Chu et al., 2004, The photocatalytic degradation of dicamba in TiO2 suspensions with the help of hyd. perox. by different near UV irradiations, Water Research 38:1037-1043.
Clancy et al., 2000, Using UV to Inactivate *Cryptosporidium*, American Water Works Association Journal; Sep., pp. 97-104, 107.
Cooper et al., 1994, Process Options for Phosphorus and Nitrogen Removal from Wastewater, J. Inst. Water Envrion. Manag. 8:84-92.
Crittenden et al., 1996, Solar detoxification of fuel-contaminated groundwater using fixed-bed photocatalysts, Water Environment Resesrch, vol. 68, No. 3, pp. 270-278.
Czarnetzki, et al., 1992, Formation of Hypochlorite, Chlorate, and Oxygen During NaCl Electrolysis from Alkaline-Solutions at a RuO2/TiO2 Anode, J. Appl. Eletchem. 22:315-324.
Davis et al., 2000, Alternative Sorbents for Removing MTBE from Gasoline-Contaminated Groundwater, J. Environ. Eng., 126: 354.
Delos Reyes, et al., 1996, Combination of a Bead Filter and Rotating Biological Contactor in a Recirculating Fish Culture System, Aquacultural Engineering vol. 15, pp. 27-39.
Dunlop et al., 2008, Photocatalytic inactivation of *Clostridium perfringens* spores on TiO2 electrodes, Journal of Photochemistry and Photobiology A: Chemistry 196: 113-119.
Egerton et al., 2006, Photoelectrocatalysis by titanium dioxide for water treatment, Int. J. Environment and Pollution, vol. 27, Nos. 1/2/3, pp. 2-19.
Eslami et al., 2008, Photocatalytic Degradation of methyl tert-butyl ether (MTBE) in Contaminated Water by ZnO Nanoparticles, J Chem Technol Biotechnol 83:1447-1453.
Fraga et al., 2009, Evaluation of the photoelectrocatalytic method for oxidi. chl. & simult. removal of microcystin toxins in surface waters, Electrochimica Acta 54:2069-2076.
Fujishima et al., 1998, Interfacial photochemistry: Fundamentals and applications, Pure & Appl. Chem.,vol. 70, No. 11, pp. 2177-2187.
Garrett et al., 1986, MTBE As Grd. Water Contam., Procds. of MWWA/API Conf. on Petro. Hydrocarb. & Org. Chem. in Grd. Water, Hou. Tex. Nov. 12-14, Dublin, OH, NWWA, p. 227-238.
Gerischer, 1993,Photoelectrochemical Catalysis of the Oxidation of Organic Mol. by Oxygen on Small Semiconductor Particles with TiO2 as an Example, Electrochimica Acta, 38:3-9.
Gupta et al., 1995, Toxicity of Methyl Tertiary Butyl Ether to *Daphnia magna* and *Photobacterium phosphoreum*, Bull. Environ. Contam. Toxicol., 55:618-620.
Helmer et al., 1998, Simultaneous Nitrificationidenitrification in an Aerobic Biofilm System, Wat. Sci. Tech., vol. 37. No. 4-5. pp. 183-187.
Hoffman et al., 1994, Photocatalytic Production of H2O2 and Organic Peroxide on Quantum-Sized Semiconductor Colloids, Environ. Sci. Technol. 28: 776-785.
Hoffman et al., 1995, Environmental Applications of Semiconductor Photocatalysis, Chem. Rev. 1995, 95, pp. 69-96.
Ip et al., 2001, Ammonia Toxicity, Tolerance, and Excretion, Fish Physioldgy, vol. 20: Nitrogen Excretion, pp. 109-148.
Johnson et al., 2000, MTBE to What Extent Will Past Releases Contaminate Community Water Supply Wells?, Environmental Science & Technology, May 1, 2000, pp. 2-9.
Kaneko et al., 2006, Photoelectrochemical reaction of biomass & bio-related compounds w/ nanoporous TiO2 film photoanode and O2-reducing cathode, Electrochem. Comm. 8:336-340.

Keller, et al., 1998, An integral cost-benefit analysis of gaso. form. mtg. Cali. Phase II Reformulated Gaso. requirements, Cost-Benefit Analysis of Gaso. Formu., pp. 1-56.
Kim et al., 1994, Photoelectrocatalytic Degradation of Formic Acid Using a Porous TiO2 Thin-Film Electrode, Environ. Sci. Technol. 1994, 28:479-483.
Kim et al., 1995, Effects of Firing Temperature on Photocatalytic and Photoelectrocatalytic Properties of TiO2, J. Environ. Engin., Aug. 1995, pp. 590-594.
Knudson, 1985, Photoreactivation of UV-Irradiated *Legionella pneumophila* and Other *Legionella* Species, Applied and Environmental Microbiology, vol. 49, No. 4, p. 975-980.
Kropp et al., 2009, A device that converts aqueous ammonia into nitrogen gas, Aquacultural Engineering 41 (2009) pp. 28-34.
Lee et al., 2002, Residual Chlorine Distribution and Disinfection during Electrochemical Removal of Dilute Ammonia from an Aqueous Solution, J. Chem. Eng. Japan, 35:285-289.
Li et al., 2005, Photoelectrocatalytic degradation of bisphenol A in aqueous solution using a Au—TiO2/ITO film, Journal of Applied Electrochemistry (2005) 35:741-750.
Liang, et al., 1999, Oxidation of MTBE by Ozone and Peroxone Processes, J. Am. Water Works Assoc. vol. 91, Issue 6, pp. 104-114.
Lin, et al., 1996, Photodegradation of Aroclor 1254 Using Simulated Sunlight and Various Sensitizers, Bull. Environ. Contam. Toxicol. (1996) 56:566-570.
Lin, et al., 1997, Electrochemical Nitrite and Ammonia Oxidation in Sea Water, J. Environ. Sci. Health, A32(8), 2125-2138.
Lin, et al., 1996, Electrochemical Removal of Nitrite and Ammonia for Aquaculture, Wat. Res. vol. 30, pp. 715-721.
Long et al., 2004, A comparison of the survival of F+RNA and F+DNA coli phages in lake water microcosms, J. Water and Health, vol. 2, Issue: 1, Mar. 2004, pp. 15-22.
Malone et al., 2000, Use of Floating Bed Filters to Recondition Recirculating Waters in Warm Water Aquaculture Product Systems, Aquacul. Eng. 22:57-73.
Mamane et al., 2007, Inactivation of *E. coli*, *B. subtilis* spores, and MS2, T4, and T7 phage using UV/H2O2 advanced oxidation, Journal of Hazardous Materials 146 (2007) 479-486.
Matthews, 1988, An Adsorption Water Purifies with in Situ Photocatalytic Regeneration, Journal of Catalysis 113: 549-555.
Matthews, 1988, Kinetics of Photocatalytic Oxidation of Organic Solutes over Titanium Dioxide, Journal of Catalysis 111: 264-272.
Matthews, 1986, Photo-Oxidation of Organic Material in Aqueous Suspensions of Titanium Dioxide, Wat. Res. vol. 20, No. 5, pp. 569-578.
McClure et al., 2000, A big advance in cleaning up small MTBE levels, Environmental Protection, May 2000, pp. 20, 22-25.
Mofidi et al., 2002,The effect of UV light on the inactivation of *Giardia lamblia* & *Giardia muris* cysts as determined by animal infectivity assay, Water Research 36:2098-2108.
Ollis et al., 1991, Destruction of Water Contaminants, Environ. Sci. Technol., vol. 25, No. 9, 1991, pp. 1522-1529.
Pavasupree et al., 2006, Structural, Photocatalytic Activity & Photovoltaic Prop. of Mesoporous Anatase Titania Nanopowders Prep. by Hydrothermal Method, Nov. 21-23 Thailand.
Pereira et al., 2008, Comparing Efficacy of Cl., ClO2, & O3 in Inactivation of *Cryptosporidium parvumin* Water from Parana State, S. Brazil, Appl Biochem Biotechnol 151:464-473.
Randall, et al., 2002, Ammonia Toxicity in Fish, Marine Pollution Bulletin 45:17-23.
Rice et al., 1999, Chlorine Inactivation of *Escherichia coli* O157:H7, Emerging Infectious Diseases, vol. 5, No. 3., May-Jun. 1999, pp. 461-463.
Russo et al., 1991, Toxicity of Ammonia, Nitrite, and Nitrate to Fishes, Aquaculture and Water Quality, pp. 58-89.
Sakulkhaemaruethai et al., 2005, Photocatalytic activity of titania nanocrystals prep. by surfactant-assisted templating method . . . , Materials Letters 59: 2965-2968.
Selcuk et al., 2005, Effect of pH, charge separation and ox. concentration in photoelectro. systems: active chlorine production & chlorate formation, Deslination, 176:219-227.

(56) References Cited

OTHER PUBLICATIONS

Selli et al., 2005, Degradation of methyl tert-butyl ether in water: effects of the combined use of sonolysis and photocatalysis, Ultrasonics Sonochemistry 12 (2005) 395-400.

Shang et al., 2007, MS2 Coliphage Inactivation with UV Irradiation and Free Chlorine/Monochloramine, Environmental Engineering Science, vol. 24, No. 9, pp. 1321-1332.

Squillace et al., 1996, Environmental Behavior and Fate of Methyl tert-Butyl Ether (MTBE), U.S. Geological Survey-NAWQA, pp. 1-6.

Stefan et al., 2000, Degradation Pathways during the Treatment of Methyl tert-Butyl Ether by the UV/H2O2 Process, Environ. Sci. Technol. 2000, 34:650-658.

Sun et al., 1998, Kinetics & Mechanism of Photoelect. Oxid. Nitrite Ion by Using Rutile Form TiO2/Ti Photoele. w/ High Electric Field Enhan., Ind. Eng. Chem. Res. 37:4207-4214.

Thompson et al., 2003, Detection of Infectious Human Adenoviruses in Tertiary-Treated and Ultraviolet-Disinfected Wastewater, Water Environment Research, 75:163-170.

Tomasso, 1994, Toxicity of Nitrogeneous Wastes to Aquaculture Animals, Reviews in Fisheries Science, 2(4): 291-314.

USEPA, Dec. 1997, Drinking Water Advisory: Consumer Acceptability Advice and Health Effects Analysis on Methyl Tertiary-Butyl Ether (MtBE), EPA-822-F-97-OO9, pp. 1-42.

USEPA, Jun. 2003, Ultraviolet Disinfection Guidance Manual, EPA-815-D-03-007, pp. 1-556.

USEPA, 2008, Rules Part 141—National Primary Drinking Water Regulations.

Van Rijn J, 1996, The Potential for Integrated Biological Treatment Systems in Recirculating Fish Culture—A Review, Aquaculture 139 (1996) 181-201.

Venkatesan et al., 2008, Isolation & Detection Indicator MS2 Coliphage different environ. & sea goods by PEG Precip. & GAC-UAPB-RT-PCR Meth, Adv. Biotech, Jul. 2008, pp. 26-32.

Vinodgopal, et al., 1993, Electrochem. Assist. Photocat. TiO2 Part. Film Elect. for Photocat. Degrad. of 4-Chlorophenol, J. Phys. Chem. 97:9040-9044.

Vinodgopal, et al., 1996, Nano. Semi. Films for Photocat.: Photoelec. Behav. of SnO2/TiO2 Comp. Sys. & its Role in Photocata. Degrad. of Text. Azo Dye, Chem. Mat. 8:2180-2187.

Wilkinson, 1961, A Simple Method for Determining Rate Constants and Orders of Reaction, Chemistry and Industry, pp. 1395-1397.

Wolfe et al., 1989, Inactivation of Giardia murls and Indicator Organisms Seeded in Surface Water Supplies by Peroxone and Ozone, Environ. Sci. Technol. 1989, 23:744-745.

Zang et al., 2005, Photocatalytic Decomposition of Methyl Tert-Butyl Ether in Aqueous Slurry of Titanium Dioxide, Applied Catalysis B: Environmental 57 (2005) 275-282.

Zanoni et al., 2004, Photoelectrocatalytic Production of ACtive Chlorine on Nanocrystalline Titanium Dioxide Thin-Film Electrodes, Environ. Sci. Technol. 38:3203-3208.

APPARATUS AND METHOD FOR TREATING AQUEOUS SOLUTIONS AND CONTAMINANTS THEREIN

CROSS REFERENCE TO RELATED APPLICATIONS

This application claims priority as a continuation application to U.S. patent application Ser. No. 13/544,721 filed Jul. 9, 2012, now U.S. Pat. No. 8,398,828, which claims the benefit of U.S. Provisional Patent Application Ser. No. 61/613,357 filed Mar. 20, 2012, and U.S. Provisional Patent Application Ser. No. 61/583,974 filed Jan. 6, 2012, the contents of which are hereby incorporated by reference in their entirety.

BACKGROUND

Aqueous solutions often contain one or more contaminants. Such aqueous solutions include, but are not limited to, hydraulic fracturing fluid, hydraulic fracturing backflow water, high-salinity solutions, groundwater, seawater, wastewater, drinking water, aquaculture (e.g., aquarium water and aquaculture water) and ballast water. Further information of example aqueous solutions follows.

Hydraulic fracturing fluid includes any fluid or solution utilized to stimulate or produce gas or petroleum, or any such fluid or solution after it is used for that purpose.

Groundwater includes water that occurs below the surface of the Earth, where it occupies spaces in soils or geologic strata. Groundwater may include water that supplies aquifers, wells and springs.

Wastewater may be any water that has been adversely affected in quality by effects, processes, and/or materials derived from human or non-human activities. For example, wastewater may be water used for washing, flushing, or in a manufacturing process, that contains waste products. Wastewater may further be sewage that is contaminated by feces, urine, bodily fluids and/or other domestic, municipal or industrial liquid waste products that is disposed of (e.g., via a pipe, sewer, or similar structure or infrastructure or via a cesspool emptier). Wastewater may originate from blackwater, cesspit leakage, septic tanks, sewage treatment, washing water (also referred to as "graywater"), rainfall, groundwater infiltrated into sewage, surplus manufactured liquids, road drainage, industrial site drainage, and storm drains, for example.

Drinking water includes water intended for supply, for example, to households, commerce and/or industry. Drinking water may include water drawn directly from a tap or faucet. Drinking water may further include sources of drinking water supplies such as, for example, surface water and groundwater.

Aquarium water includes, for example, freshwater, seawater, and saltwater used in water-filled enclosures in which fish or other aquatic plants and animals are kept or intended to be kept. Aquarium water may originate from aquariums of any size such as small home aquariums up to large aquariums (e.g., aquariums holding thousands to hundreds of thousands of gallons of water).

Aquaculture water is water used in the cultivation of aquatic organisms. Aquaculture water includes, for example, freshwater, seawater, and saltwater used in the cultivation of aquatic organisms.

Ballast water includes water, such as freshwater and seawater, held in tanks and cargo holds of ships to increase the stability and maneuverability during transit. Ballast water may also contain exotic species, alien species, invasive species, and/or nonindiginous species of organisms and plants, as well as sediments and contaminants.

A contaminant may be, for example, an organism, an organic chemical, an inorganic chemical, and/or combinations thereof. More specifically, "contaminant" may refer to any compound that is not naturally found in an aqueous solution. Contaminants may also include microorganisms that may be naturally found in an aqueous solution and may be considered safe at certain levels, but may present problems (e.g., disease and/or other health problems) at different levels. In other cases (e.g., in the case of ballast water), contaminants also include microorganisms that may be naturally found in the ballast water at its point of origin, but may be considered non-native or exotic species. Moreover, governmental agencies such as the United States Environmental Protection Agency, have established standards for contaminants in water.

A contaminant may include a material commonly found in hydraulic fracturing fluid before or after use. For example, the contaminant may be one or more of the following or combinations thereof: diluted acid (e.g., hydrochloric acid), a friction reducer (e.g., polyacrylamide), an antimicrobial agent (e.g. glutaraldehyde, ethanol, and/or methanol), scale inhibitor (e.g. ethylene glycol, alcohol, and sodium hydroxide), sodium and calcium salts, barium, oil, strontium, iron, heavy metals, soap, bacteria, etc. A contaminant may include a polymer to thicken or increase viscosity to improve recovery of oil. A contaminant may also include guar or guar gum, which is commonly used as a thickening agent in many applications in oil recovery, the energy field, and the food industry.

A contaminant may be an organism or a microorganism. The microorganism may be for example, a prokaryote, a eukaryote, and/or a virus. The prokaryote may be, for example, pathogenic prokaryotes and fecal coliform bacteria. Example prokaryotes may be Escherichia, Brucella, Legionella, sulfate reducing bacteria, acid producing bacteria, Cholera bacteria, and combinations thereof.

Example eukaryotes may be a protist, a fungus, or an algae. Example protists (protozoans) may be Giardia, Cryptosporidium, and combinations thereof. A eukaryote may also be a pathogenic eukaryote. Also contemplated within the disclosure are cysts of cyst-forming eukaryotes such as, for example, Giardia.

A eukaryote may also include one or more disease vectors. A "disease vector" refers any agent (person, animal or microorganism) that carries and transmits an infectious pathogen into another living organism. Examples include, but are not limited to, an insect, nematode, or other organism that transmits an infectious agent. The life cycle of some invertebrates such as, for example, insects, includes time spent in water. Female mosquitoes, for example, lay their eggs in water. Other invertebrates such as, for example, nematodes, may deposit eggs in aqueous solutions. Cysts of invertebrates may also contaminate aqueous environments. Treatment of aqueous solutions in which a vector (e.g., disease vector) may reside may thus serve as a control mechanism for both the disease vector and the infectious agent.

A contaminant may be a virus. Example viruses may include a waterborne virus such as, for example, enteric viruses, hepatitis A virus, hepatitis E virus, rotavirus, and MS2 coliphage, adenovirus, and norovirus.

A contaminant may include an organic chemical. The organic chemical may be any carbon-containing substance according to its ordinary meaning. The organic chemical may be, for example, chemical compounds, pharmaceuticals, over-the-counter drugs, dyes, agricultural pollutants, industrial pollutants, proteins, endocrine disruptors, fuel oxygenates, and/or personal care products. Examples of organic chemicals may include acetone, acid blue 9, acid yellow 23, acrylamide, alachlor, atrazine, benzene, benzo(a)pyrene, bromodichloromethane, carbofuran, carbon tetrachloride, chlorobenzene, chlordane, chloroform, chloromethane, 2,4-dichlorophenoxyacetic acid, dalapon, 1,2-dibromo-3-chloropropane, o-dichlorobenzene, p-dichlorobenzene, 1,2-dichloroethane, 1,1-dichloroethylene, cis-1,2-dichloroethylene, trans-1,2-dichloroethylene, dichlormethane, 1,2-dichloropropane, di(2-ethylhexyl)adipate, di(2-ethylhexyl)phthalate, dinoseb, dioxin (2,3,7,8-TCDD), diquat, endothall, endrin, epichlorohydrin, ethylbenzene, ethylene dibromide, glyphosate, a haloacetic acid, heptachlor, heptachlor epoxide, hexachlorobenzene, hexachlorocyclopentadiene, lindane, methyl-tertiary-butyl ether, methyoxychlor, napthoxamyl (vydate), naphthalene, pentachlorophenol, phenol, picloram, isopropylbenzene, N-butylbenzene, N-propylbenzene, Sec-butylbenzene, polychlorinated biphenyls (PCBs), simazine, sodium phenoxyacetic acid, styrene, tetrachloroethylene, toluene, toxaphene, 2,4,5-TP (silvex), 1,2,4-trichlorobenzene, 1,1,1-trichloroethane, 1,1,2-trichloroethane, trichloroethylene, a trihalomethane, 1,2,4-trimethylbenzene, 1,3,5-trimethylbenzene, vinyl chloride, o-xylene, m-xylene, p-xylene, an endocrine disruptor, a G-series nerve agent, a V-series nerve agent, bisphenol-A, bovine serum albumin, carbamazepine, cortisol, estradiol-17β, gasoline, gelbstoff, triclosan, ricin, a polybrominated diphenyl ether, a polychlorinated diphenyl ether, and a polychlorinated biphenyl. Methyl tert-butyl ether (also known as, methyl tertiary-butyl ether) is a particularly applicable organic chemical contaminant.

A contaminant may include an inorganic chemical. More specifically, the contaminant may be a nitrogen-containing inorganic chemical such as, for example, ammonia ($NH_3$) or ammonium ($NH_4$). Contaminants may include non-nitrogen-containing inorganic chemicals such as, for example, aluminum, antimony, arsenic, asbestos, barium, beryllium, bromate, cadmium, chloramine, chlorine, chlorine dioxide, chlorite, chromium, copper, cyanide, fluoride, iron, lead, manganese, mercury, nickel, nitrate, nitrite, selenium, silver, sodium, sulfate, thallium, and/or zinc.

A contaminant may include a radionuclide. Radioactive contamination may be the result of a spill or accident during the production or use of radionuclides (radioisotopes). Example radionuclides include, but are not limited to, an alpha photon emitter, a beta photon emitter, radium 226, radium 228, and uranium.

Various methods exist for handling contaminants and contaminated aqueous solutions. Generally, for example, contaminants may be contained to prevent them from migrating from their source, removed, and immobilized or detoxified.

Another method for handling contaminants and contaminated aqueous solutions is to treat the aqueous solution at its point-of-use. Point-of-use water treatment refers to a variety of different water treatment methods (physical, chemical and biological) for improving water quality for an intended use such as, for example, drinking, bathing, washing, irrigation, etc., at the point of consumption instead of at a centralized location. Point-of-use treatment may include water treatment at a more decentralized level such as a small community or at a household. A drastic alternative is to abandon use of the contaminated aqueous solutions and use an alternative source.

Other methods for handling contaminants and contaminated aqueous solutions are used for removing gasoline and fuel contaminants, and particularly the gasoline additive, MTBE. These methods include, for example, phytoremediation, soil vapor extraction, multiphase extraction, air sparging, membranes (reverse osmosis), and other technologies. In addition to high cost, some of these alternative remediation technologies result in the formation of other contaminants at concentrations higher than their recommended limits. For example, most oxidation methods of MTBE result in the formation of bromate ions higher than its recommended limit of 10 µg/L in drinking water (Liang et al., "Oxidation of MTBE by ozone and peroxone processes," J. Am. Water Works Assoc. 91:104 (1999)).

A number of technologies have proven useful in reducing MTBE contamination, including photocatalytic degradation with UV light and titanium dioxide (Barreto et al., "Photocatalytic degradation of methyl tert-butyl ether in $TiO_2$ slurries: a proposed reaction scheme," Water Res. 29:1243-1248 (1995); Cater et al., $UV/H_2O_2$ treatment of MTBE in contaminated water," Environ. Sci Technol. 34:659 (2000)), oxidation with UV and hydrogen peroxide (Chang and Young, "Kinetics of MTBE degradation and by-product formation during UV/hydrogen peroxide water treatment," Water Res. 34:2223 (2000); Stefan et al., Degradation pathways during the treatment of MTBE by the $UV/H_2O_2$ process," Environ. Sci. Technol. 34:650 (2000)), oxidation by ozone and peroxone (Liang et al., "Oxidation of MTBE by ozone and peroxone processes," J. Am. Water Works Assoc. 91:104 (1999)) and in situ and ex situ bioremediation (Bradley et al., "Aerobic mineralization of MTBE and tert-Butyl alcohol by stream bed sediment microorganisms," Environ. Sci. Technol. 33:1877-1879 (1999)).

Use of titanium dioxide (titania, $TiO_2$) as a photocatalyst has been shown to degrade a wide range of organic pollutants in water, including halogenated and aromatic hydrocarbons, nitrogen-containing heterocyclic compounds, hydrogen sulfide, surfactants, herbicides, and metal complexes (Matthews, "Photo-oxidation of organic material in aqueous suspensions of titanium dioxide," Water Res. 220:569 (1986); Matthews, "Kinetic of photocatalytic oxidation of organic solutions over titanium-dioxide," J. Catal. 113:549 (1987); Ollis et al., "Destruction of water contaminants," Environ. Sci. Technol. 25:1522 (1991)).

Irradiation of a semiconductor photocatalyst, such as titanium dioxide ($TiO_2$), zinc oxide, or cadmium sulfide, with light energy equal to or greater than the band gap energy (Ebg) causes electrons to shift from the valence band to the conduction band. If the ambient and surface conditions are correct, the excited electron and hole pair can participate in oxidation-reduction reactions. The oxygen acts as an electron acceptor and forms hydrogen peroxide. The electron donors (i.e., contaminants) are oxidized either directly by valence band holes or indirectly by hydroxyl radicals (Hoffman et al., "Photocatalytic production of $H_2O_2$ and organic peroxide on quantum-sized semi-conductor colloids," Environ. Sci. Technol. 28:776 (1994)). Additionally, ethers can be degraded oxidatively using a photocatalyst such as $TiO_2$ (Lichtin et al., "Photopromoted titanium oxide-catalyzed oxidative decomposition of organic pollutants in water and in the vapor phase," Water Pollut. Res. J. Can. 27:203 (1992)). A reaction scheme for photocatalytically destroying MTBE using UV and $TiO_2$ has been proposed, but photodegradation took place only in the presence of catalyst, oxygen, and near UV irradiation and MTBE was converted to several intermediates (tertiary-butyl formate, tertiary-butyl alcohol, acetone, and alpha-hydroperoxy MTBE) before complete mineralization (Barreto et al. "Photocatalytic degradation of methyl tert-butyl ether in $TiO_2$ slurries: a proposed reaction scheme," Water Res. 29:1243-1248 (1995)).

A more commonly used method of treating aqueous solutions for disinfection of microorganisms is chemically treating the solution with chlorine. Disinfection with chlorine, however, has several disadvantages. For example, chlorine content must be regularly monitored, formation of undesirable carcinogenic by-products may occur, chlorine has an unpleasant odor and taste, and chlorine requires the storage of water in a holding tank for a specific time period.

Aqueous solutions used for hydraulically fracturing gas wells (e.g., fracturing or frac fluids) or otherwise stimulating petroleum, oil and/or gas production also require treatment. Such solutions or frac fluids typically include one or more components or contaminants including, by way of example and without limitation, water, sand, diluted acid (e.g., hydrochloric acid), one or more polymers or friction reducers (e.g., polyacrylamide), one or more antimicrobial agents (e.g. glutaraldehyde, ethanol, and/or methanol), one or more scale inhibitors (e.g. ethylene glycol, alcohol, and sodium hydroxide), and one or more thickening agents (e.g., guar). In addition, a significant percentage of such solutions and fluids return toward the Earth surface as flowback, and later as produced water, after they have been injected into a hydrofrac zone underground. As they return toward the Earth surface, the solutions and fluids also pick up other contaminants from the earth such as salt (e.g., sodium and calcium salts). Such fluids may also include barium, oil, strontium, iron, heavy metals, soap, high concentrations of bacteria including acid producing and sulfate reducing bacteria, etc.

Aqueous solutions used for hydraulically fracturing gas wells or otherwise stimulating oil and gas production are difficult and expensive to treat for many reasons including, without limitation, the salinity of the solutions. For that reason, such fluids are often ultimately disposed of underground, offsite, or into natural water bodies. In some cases, certain states and countries will not allow fracking due to remediation concerns.

Accordingly, there is a need in the art for alternative approaches for treating aqueous solutions to remove and/or reduce amounts of contaminants. Specifically, it would be advantageous to have apparatus and/or methods for treating various aqueous solutions including hydraulic fracturing fluid, hydraulic fracturing backflow water, high-salinity water, groundwater, seawater, wastewater, drinking water, aquarium water, and aquaculture water, and/or for preparation of ultrapure water for laboratory use and remediation of textile industry dye waste water, among others, that help remove or eliminate contaminants without the addition of chemical constituents, the production of potentially hazardous by-products, or the need for long-term storage.

SUMMARY

The present disclosure is generally directed to devices and methods of treating aqueous solutions to help remove or otherwise reduce levels or amounts of one or more contaminants. More specifically, the present disclosure relates to an apparatus for removing or reducing the level of contaminants in a solution comprising: a container having an inner box provided therein; the inner box comprising a first sidewall and a second sidewall, and an inner box cover and spaced-apart electrode structural support members extending from the first sidewall to the second sidewall; the inner box cover defining apertures with sleeves provided therein that extend into a space between the spaced-apart electrode structural support members; the spaced-apart electrode structural support members each having a photoelectrode and counterelectrode provided thereon with a separator provided between the photoelectrode and counterelectrode; wherein the photoelectrode comprises a primarily titanium foil support with a layer of titanium dioxide provided thereon; and wherein the photoelectrode and counterelectrode are each coupled to a respective terminal adapted to be electrically coupled to a power supply.

The present disclosure further relates to an apparatus for removing or reducing the level of contaminants in a solution comprising a container having an inner structure provided therein; the inner structure comprising a sidewall, and an inner structure cover and spaced-apart electrode structural support members extending from the sidewall to form a cell between the spaced-apart electrode structural support members; the inner structure cover defining apertures with sleeves provided therein that extend at least from the inner structure cover to a bottom of the cell formed between the spaced-apart electrode structural support members; the spaced-apart electrode structural support members each having a photoelectrode and counterelectrode provided thereon with a separator provided between the photoelectrode and counterelectrode; wherein the photoelectrode comprises a primarily titanium foil support with a layer of titanium dioxide provided thereon; and wherein the photoelectrode and counterelectrode are each coupled to a terminal adapted to be electrically coupled to a power supply.

The present invention also relates to an apparatus for removing or reducing the level of contaminants in a solution comprising a container having an inner structure provided therein; the inner structure comprising a first set of opposing members coupled to a second set of opposing members, and spaced-apart electrode structural support members extending between the first and second set of opposing members; the spaced-apart electrode structural support members each having a photoelectrode and counterelectrode provided thereon with a separator provided between the photoelectrode and counterelectrode; wherein the first set of opposing members define apertures with sleeves provided therein, which sleeves extend at least from one opposing member of the first set of opposing structure members to another opposing member of the first set of opposing members into a space between the spaced-apart electrode structural support members; wherein the photoelectrode comprises a primarily titanium foil support with a layer of titanium dioxide provided thereon; and wherein the photoelectrode and counterelectrode are each coupled to a terminal adapted to be electrically coupled to a power supply.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

Figure 1:
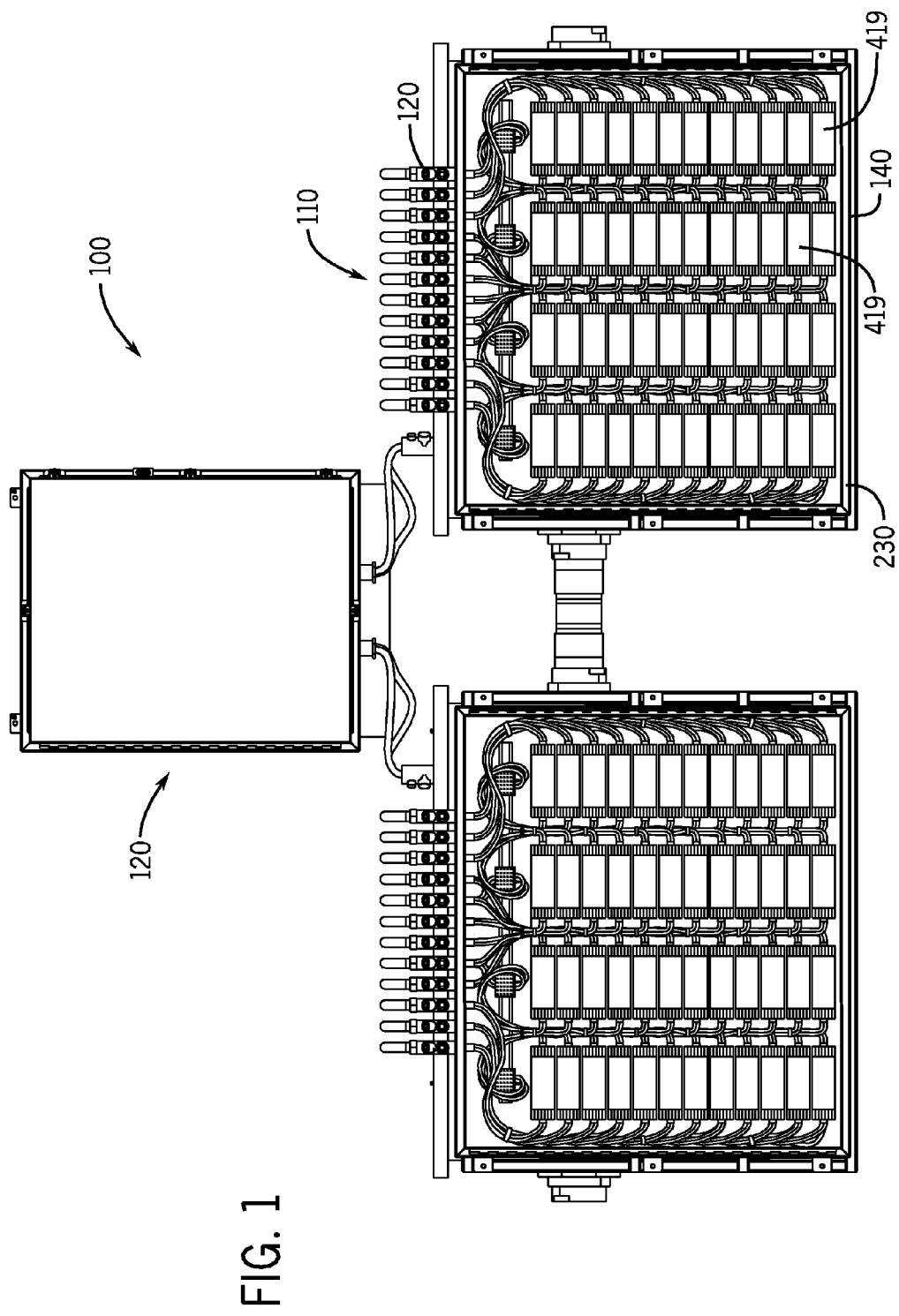
FIG. 1 is a partially broken front view of a PECO system including a PECO device, according to one or more examples of embodiments.

While the disclosure is susceptible to various modifications and alternative forms, specific embodiments thereof have been shown by way of example in the drawings and are herein described below in detail. For example, any numbers, measurements, and/or dimensions illustrated in the Figures are for purposes of example only. Any number, measurement or dimension suitable for the purposes provided herein may be acceptable. It should be understood that the description of specific embodiments is not intended to limit the disclosure from covering all modifications, equivalents and alternatives falling within the spirit and scope of the disclosure.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein may be used in the practice or testing of the present disclosure, example methods and materials are described below.

Various embodiments of a photoelectric catalytic oxidation (PECO) system and device are described. In various embodiments, the PECO device includes and/or is provided in an apparatus or reactor or substantially self-contained device. The reactor in various embodiments includes a container which is adapted to receive components (e.g. operative components) of the PECO device and/or receive, contain and/or circulate fluid or aqueous solution. In various embodiments, the container houses a plurality of counterelectrodes (e.g. cathodes) and photoelectrodes (e.g. anodes) provided or arranged on structural supports spaced on opposing sides of UV light sources and forming a series of cells. In various embodiments, the plurality of counterelectrodes (e.g. cathodes), photoelectrodes (e.g. anodes), corresponding supports, and UV light sources may be provided in an inner structure or box received within the container. In various embodiments, flow of fluid or solution is facilitated in a serpentine or undulating pattern through the series of cells. In various embodiments, one or more a power supplies and/or ballasts are included or provided for powering the UV-light sources and/or for providing electrical potential to one or more of the counterelectrodes (e.g., cathodes) and photoelectrodes (e.g., anodes). In various embodiments, one or more power supplies and/or ballasts are electrically coupled to UV-light sources and/or electrodes but provided externally to the container.

Generally, in various embodiments, a method for reducing the level or amount of one or more contaminants in solution or fluid described includes introducing the solution into a housing or container or cell including: a UV light; a photoelectrode (e.g., anode), wherein the photoelectrode comprises an anatase polymorph of titanium, a rutile polymorph of titanium, or a nanoporous film of titanium dioxide; and a counterelectrode (e.g., cathode). In various embodiments, the photoelectrode is irradiated with UV light, and a first potential is applied to the photoelectrode and counterelectrode for a first period of time. In various embodiments, a second potential is applied to the photoelectrode and counterelectrode for a second period of time. As a result, in various embodiments, the contaminant level or amount in solution is reduced.

Figure 3:
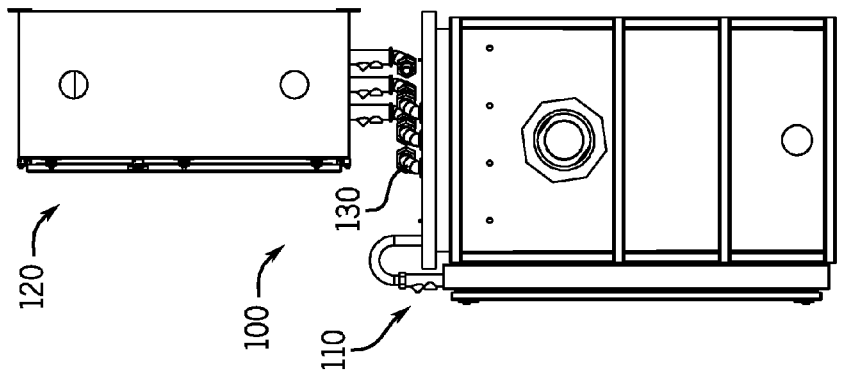
FIG. 3 is a side view of the PECO system illustrated in FIG. 2, according to one or more examples of embodiments.
Figure 2:
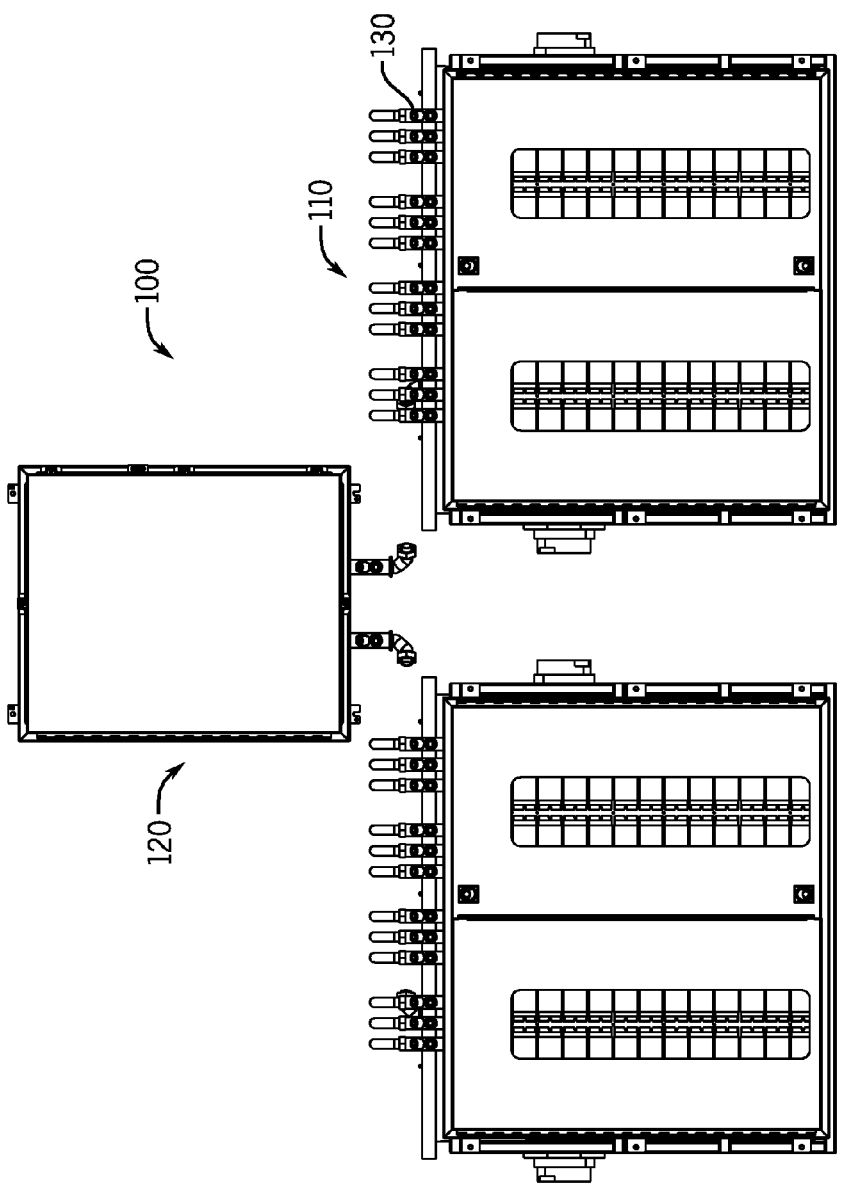
FIG. 2 is a front view of a PECO system including a PECO device, according to one or more examples of embodiments.

Referring to FIGS. 1-3, a PECO system 100 according to various embodiments is shown. In various embodiments, PECO system 100 includes a PECO unit, device, assembly or apparatus 110, and a panel 120. In various embodiments, components within panel 120 and components within PECO unit are electrically coupled. In various embodiments, and as shown in the Figures, PECO system 100 includes multiple PECO units, devices, assemblies or apparatus 110, components of which are electrically coupled to components provided in at least one panel 120. Explosion-proof or resistant fittings or couplings 130 may be utilized in connection with PECO units 110 and panel 120 to help prevent certain materials (e.g., ignitable or flammable gases or vapors) in PECO unit 110 from reaching or otherwise reacting with a component external to PECO unit 110 (e.g., a component within panel 120, a power source, a ballast, etc.). In examples of embodiments, various PECO units, devices, assemblies or apparatus 110 are in operative communication (e.g., an outlet or out-flow connection of a first PECO unit, device, assembly or apparatus is coupled (e.g., operatively coupled) to an inlet or in-flow connection of a second PECO unit, device, assembly or apparatus.

As shown in FIGS. 1-4, in various embodiments, PECO system 100 includes panel 120. In various embodiments, panel 120 may house various components of PECO system. For example, in various embodiments, panel 120 houses one or more power supplies. In various embodiments, panel 120 houses one or more controls, circuits or switches which may be utilized to operate PECO system 100 and its components. In various embodiments, panel 120 includes one or more circuits (e.g., an H circuit), switches (e.g., a MOSFET) or other devices for reversing the potential or bias across a photoelectrode and/or counterelectrode. In various embodiments, panel 120 includes a door or other component or aperture for ease of accessing components housed within panel 120. The panel may be provided with locks and/or handles or other hardware.

Figure 4:
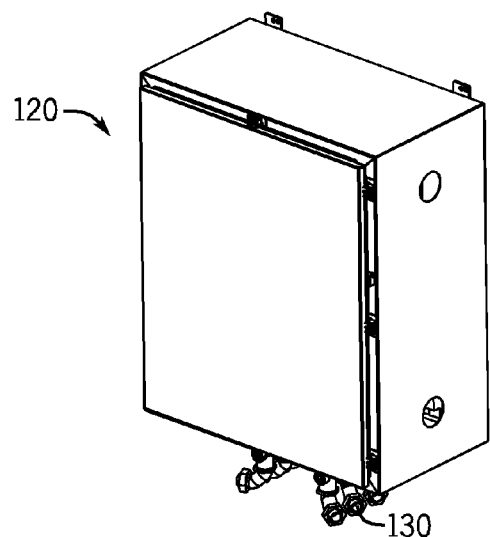
FIG. 4 is an isometric view of a panel of a PECO system, according to one or more examples of embodiments.

In various embodiments, panel 120 includes or defines one or more apertures. For example, one or more apertures may be defined by and/or provided through panel 120 to allow internal components of panel 120 to be electrically coupled to one or more components provided internally to a PECO unit or in another panel or enclosure (e.g. an electrical enclosure housing ballasts). For example, and as shown in FIG. 4, in various embodiments, a wall of panel 120 includes or defines at least one aperture through which wiring is or may be provided for electrically coupling electrodes within a PECO unit to one or more power supplies in panel 120. In various embodiments, the circuits, switches or other such devices are housed in the panel and electrically connected or coupled to components of the PECO unit (e.g. a photoelectrode, counterelectrode and/ or terminals) or other PECO system 100 components (e.g. ballasts). As shown in FIG. 4, various fittings (e.g., explosion-proof or resistant fittings) 130 are provided in or about one or more of the apertures defined by panel 120 to help prevent certain materials (e.g., ignitable or flammable gases or vapors) from reaching or otherwise reacting with components within panel 120.

As shown in the Figures, apart from any electrical connection and the like, panel 10 is mounted or otherwise provided separately from PECO unit 110. As also shown, in various embodiments, one or more components of panel 120 are electrically coupled to components of multiple PECO units 110. It should be appreciated, however, that the panel may be coupled to PECO unit 110 or the container therefor, and components of the panel may be electrically coupled to a single PECO unit 110 or additional units.

As shown in FIGS. 5-9, in various embodiments, PECO unit, device, assembly or apparatus 110 includes a container or housing 140 formed by a plurality of adjoined sidewalls coupled to a bottom. Container 140 in various embodiments (e.g., in the illustrated examples) forms a container cavity with an opening at the top to allow or provide access into the container cavity and to various PECO system 100 and/or PECO until 110 components. It is contemplated that access openings or other openings may be provided, or also provided, elsewhere (e.g., on the container sidewalls or bottom).

Container 140 may be formed of any suitable material and be of any size and/or shape suitable for its intended purposes. In various embodiments, container 140 preferably includes, or is provided with, tight seals, including upon engagement with a cover or lid 160. Further, the container may be pressurized (e.g, under negative pressure) and/or explosion-proof or resistant. While specific examples are provided, alternative materials and sizes suitable for the purposes of the PECO device are acceptable.

The container may be provided with locks and/or handles or other hardware. In various embodiments, container 140 includes or defines one or more in-flow and/or out-flow apertures, fittings or connections. For example, a first aperture may be defined by and/or provided through one or more sidewalls, the lid, or the bottom, for connection to a fluid supply source or for connection to a waste-line or out-flow connection. In one or more examples of embodiments, the fluid supply source and/or the waste-line or out-flow may be a conduit, hose, tube or pipe or other commercially available device used for transporting a fluid. In various embodiments, a suitable coupling or fitting 150 may be provided in an aperture defined in container 140, and/or otherwise coupled or attached to container 140 (e.g. for mating with the supply source or waste-line or out-flow connection and providing a tight seal for PECO device 110).

In various embodiments, container 140 also includes a container cover, top, or lid 160 sized and/or shaped to cover the opening at the top of the container cavity. Lid 160 may be entirely separable from container 140 and/or partially separable. Container cover or lid 160 may be coupled to the container by one or more hinges, or may be formed by a living hinge or plastic hinge with the container. In various embodiments, container cover or lid 160 defines or includes one or more apertures for passage of an electrical connection, wire, cable or other desirable component.

Figure 6:
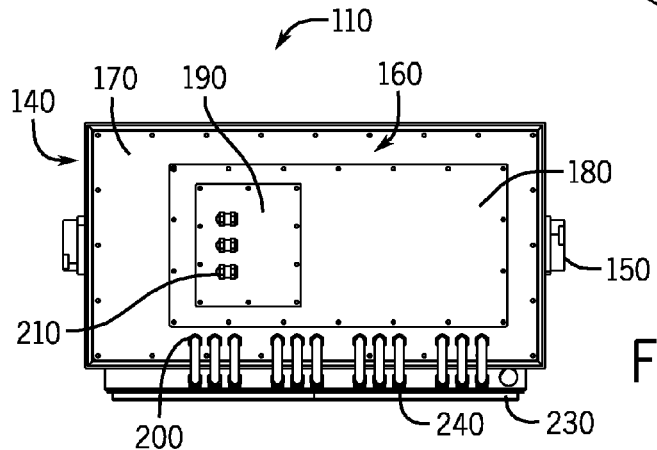
FIG. 6 is a top view of the PECO device illustrated in FIG. 5 according to one or more examples of embodiments.

Referring to FIG. 6, in various embodiments, container cover or lid 160 includes multiple members or components. As shown in FIG. 6, in various embodiments, container cover or lid 160 includes a frame member 170 and an access cover or lid 180. In various embodiments, container cover 160 includes an electrical cover or lid 190. In various embodiments, frame member 170 defines an aperture or opening that may be utilized to access components of PECO unit 110 (e.g., UV bulbs), wiring, connections, etc., without having to uncouple or remove container cover or lid 160 in its entirety. In various embodiments, access cover 180 is sized and/or shaped to cover the aperture or opening defined by frame member 170. As shown in FIG. 6, in various embodiments, access cover 180 is sized and/or shaped to overlap a portion of frame member 170 (e.g., a lip of frame member 170 helping define the aperture or opening defined by frame member 170). In various embodiments, access cover 180 is removably coupled or fastened to frame member 170.

In various embodiments, access cover 180 defines an aperture or opening that may be utilized to access components of PECO unit 110 (e.g., electrical connections) without having to uncouple or remove entire container cover or lid 160, or entire access cover or lid 180. In various embodiments, electrical cover or lid 190 is sized and/or shaped to cover the opening defined by access cover 180. As shown in FIG. 6, in various embodiments, electrical cover or lid 190 is sized and/or shaped to overlap a portion of access cover 180 (e.g., a lip of access cover 180 defining the opening). In various embodiments, electrical cover 190 or lid may be removably coupled to access cover 180.

In various embodiments, container cover or lid 160 (e.g., frame member 170 and/or electrical cover 190) includes or defines one or more apertures. For example, one or more apertures may be defined by and/or provided through container cover 160 to allow internal components of PECO unit 110 to be electrically coupled to components outside PECO unit 110 (e.g. one or more power supplies and/or ballasts provided externally to container 140). For example, and as shown in FIG. 6, in various embodiments, cover or lid 160 (e.g., frame member 170) includes or defines at least one first aperture 200 through which wiring is or may be provided for electrically coupling UV bulbs within container 140 or to ballasts outside container 140. As another example, and as shown in FIG. 6, cover or lid 160 (e.g., electrical cover 190) includes or defines at least one second aperture 210 through which wiring is or may be provided for electrically coupling electrodes within container 140 or ballasts to one or more power supplies. Referring again to FIG. 6, various fittings (e.g., explosion-proof or resistant fittings) may be provided in or about one or more of the apertures defined by container cover 160 to help prevent certain materials (e.g., ignitable or flammable gases or vapors) from reaching or otherwise reacting with a component external to PECO unit 110 (e.g., components within the panel, a power source, a ballast, etc.)

In various embodiments, removal of electrical cover 190 allows access to connections (e.g. main connections) fastener panel 120 and PECO unit 110 such that various such connections may be disconnected to allow a PECO unit 110 to be replaced with another PECO unit to allow servicing of PECO unit 110 while minimizing PECO system 100 down-time or otherwise optimizing PECO system 100 maintenance.

Figure 5:
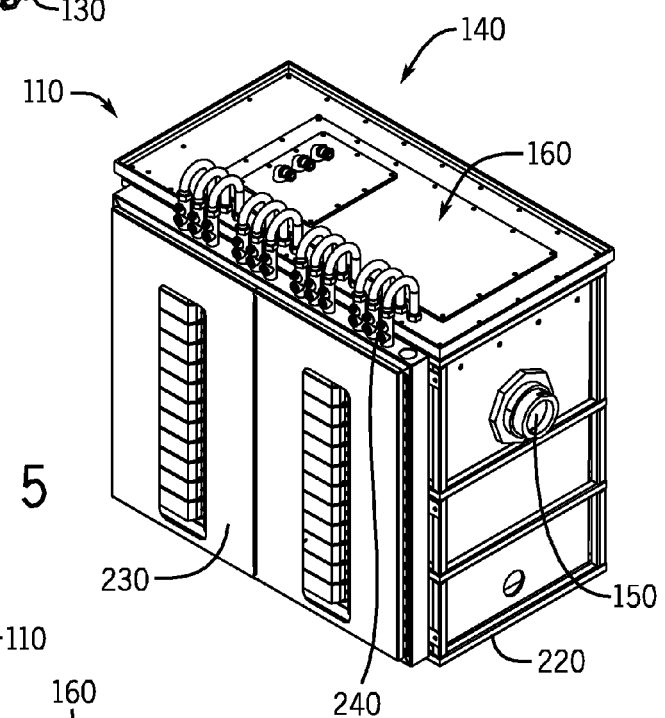
FIG. 5 is an isometric view of a PECO device, which may also be referred to as a photoelectrocatalytic cell, according to one or more examples of embodiments.
Figure 7:
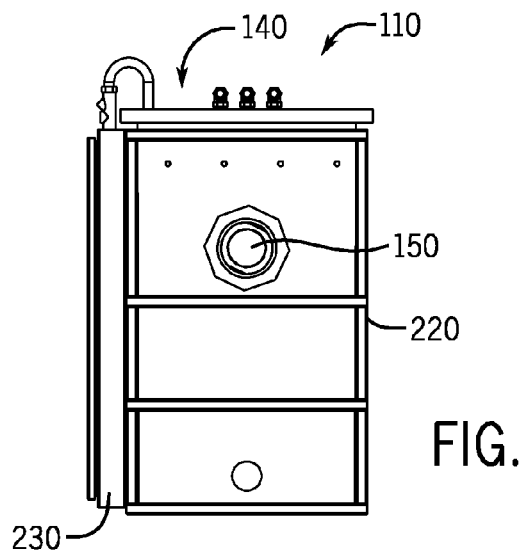
FIG. 7 is an end view of the PECO device illustrated in FIG. 5 according to one or more examples of embodiments.
Figure 8:
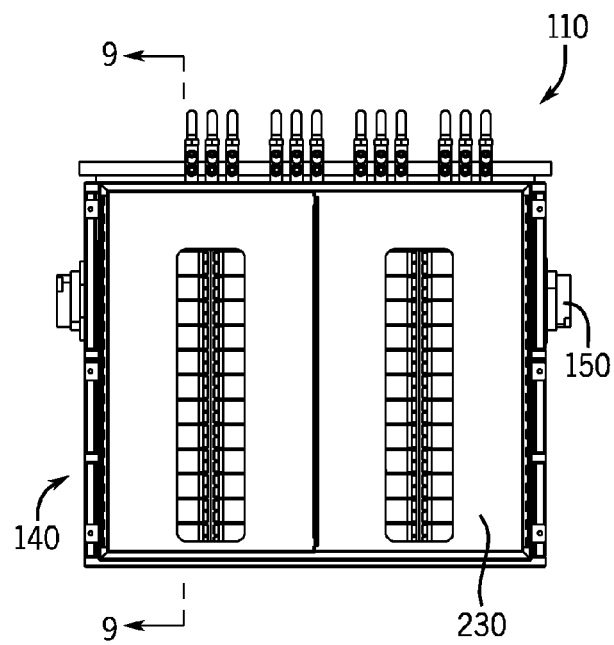
FIG. 8 is a front view of the PECO device illustrated in FIG. 5 according to one or more examples of embodiments.

Referring to FIGS. 5 and 7, container 140 may include or be provided within a support structure or frame 220. In various embodiments, support structure 220 is welded to the exterior of container 140. However, the support structure may be coupled or fastened, or removably coupled or fastened, to the container in a variety of other ways including, by way of example, through the use of bolts, other fasteners, adhesives, etc. The support structure may also be provided around the container without being affixed to the container.

In various embodiments, PECO system 100 or PECO unit 110 includes an electrical enclosure 230. Referring to FIGS. 5-8, in various embodiments, electrical enclosure 230 is provided external to container 140. In various embodiments, electrical enclosure 230 is coupled or mounted to container 140 (e.g., to a side of container 140). However, the electrical enclosure may be removably coupled or otherwise unattached to the container, apart from components housed within the electrical enclosure which, in various embodiments, are electrically coupled to one or more components housed within the container.

In various embodiments, electrical enclosure 230 (e.g., a side and/or top of electrical enclosure 230) includes or defines one or more apertures 240. For example, in various embodiments, one or more apertures 240 are provided through the top of electrical enclosure 230 to allow components of PECO unit 110 inside container 140 to be electrically coupled to one or more components (e.g. power supplies and/or ballasts) provided within electrical enclosure 230. For example, and as shown in FIGS. 5-8, in various embodiments, electrical enclosure 230 includes or defines multiple apertures through which wiring may pass or be provided for electrically coupling UV bulbs within container 140 to ballasts provided in electrical enclosure 230. In various embodiments, various fittings (e.g., explosion-proof or explosion resistant fittings) may be provided in or about the apertures defined by electrical enclosure 230 to help prevent certain materials (e.g., ignitable or flammable gases or vapors) from reaching or otherwise reacting with a component external to PECO unit 110 (e.g., a ballast or other component provided in electrical enclosure 230, etc.).

Further, in one or more examples of embodiments, electrical enclosure 230 is explosion proof or resistant. For example, the PECO system or unit may utilize a sealed electrical enclosure 230 to house electrical controls, which enclosure may be purged and/or pressurized to allow use in hazardous atmospheres. One suitable example of such a purged and pressurized atmosphere is per National Fire Protection Association (NFPA) standard 496 relating to enclosures for electrical equipment.

Figure 9:
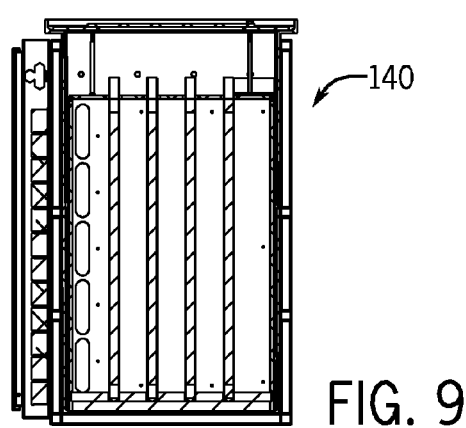
FIG. 9 is a sectional view of the PECO device illustrated in FIG. 8 according to one or more examples of embodiments.

Referring to FIG. 9, in various embodiments, the cavity of container 140 may be compartmentalized or may have one or more segments. In one or more examples of embodiments, the cavity of container 140 receives or carries a variety of components and/or structures. Various components may be provided in an inner structure or box provided in the cavity of container 140. However, it is also contemplated that the various components may be provided in the container without an inner box or structure.

An inner structure or box 300, in various embodiments and as shown in FIGS. 10-14, includes and/or is formed by a plurality of adjoined walls or sidewalls connected to a base or bottom, or to the container's bottom, forming an inner box cavity. The inner structure or box may be formed of any material and of any size and/or shape suitable for its intended purposes. For example, the inner structure or box may be a molded, high-durability plastic or polyethylene and may be formed to be resistant to one or more contaminants. As can be seen by reference to the Figures, in various embodiments, the inner structure or box is sized and/or shaped to fit within the container (e.g., the container's cavity), and may further be sized to be smaller than the width, length or diameter of the container's cavity such that one or more spaces exist or are formed between the inner structure or box walls or sidewalls and the container walls or sidewalls. The spaces between the inner structure or box walls or sidewalls may provide areas for the containment and/or flow of a solution or fluid, or other PECO unit and/or system components.

In various embodiments, the inner box is sized to leave space between the top of the inner box and the container cover or lid, and wiring may be provided in that space. In various embodiments, one or more seals are provided between the container and inner box such that the space between the top of the inner box and the container lid or cover is sealed from spaces or areas where fluid is provided, flows or is contained. In various embodiments, the space between the top of the inner structure and the container cover or lid is purged and/or pressured to help make the space more explosion-proof or resistant.

Figure 10:
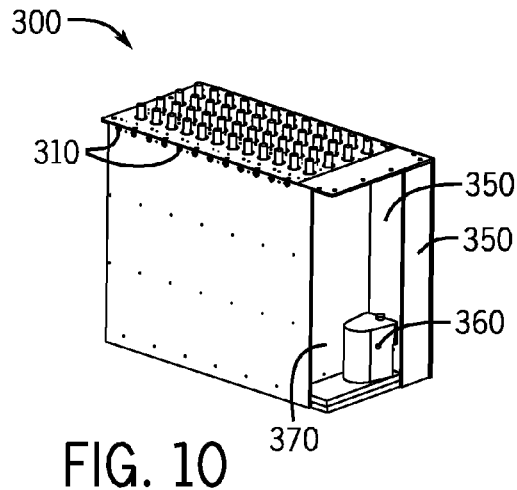
FIG. 10 is an isometric view of an inner box or structure of a PECO device, according to one or more examples of embodiments.

As shown in FIG. 10, at least one wall or sidewall of the inner structure or box defines one or more apertures or weir channels 310 about the top of the sidewall. The apertures or weir channels defined in the sidewall of the inner box or structure may help control the height of solution or fluid provided in the inner structure or box. In various embodiments, at least one wall or sidewall of the inner structure or box discloses one or more features (e.g. ridges or channels) for helping add stability and structure to inner structure box. For example, walls may include grooves to receive a portion (e.g. an edge) of electrode structure support members 370.

Figure 13:
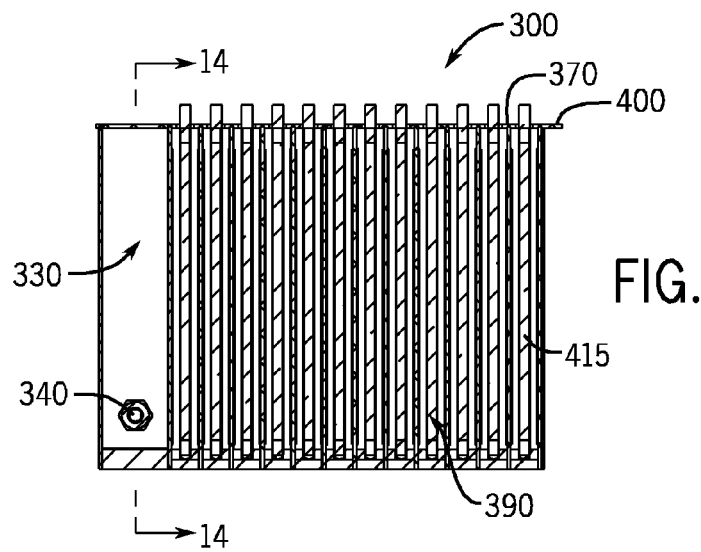
FIG. 13 is a sectional view of the inner box or system of a PECO device illustrated in FIG. 12, according to one or more examples of embodiments.
Figure 14:
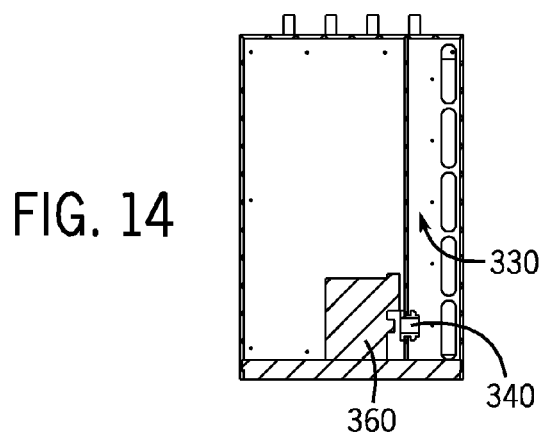
FIG. 14 is a sectional view of the inner box or structure of a PECO device illustrated in FIG. 13, according to one or more examples of embodiments.

As shown in FIGS. 10-14, in various embodiments, a baffle cavity 330 is provided near a sidewall of inner structure 300. In various embodiments, baffle cavity 330 is formed by a plurality of adjoined baffle sidewalls 350 connected or coupled to an electrode structural support member 370 about a plurality of spaced holes or apertures 320 defined by electrode structural support member 370. In various embodiments, the adjoined baffle sidewalls 350 are connected or coupled to a base or bottom, or to the bottom of inner box or structure 300, or to the bottom of the container to help form the baffle cavity. In various embodiments, a baffle sidewall 350 defines includes or defines an aperture 340. In various embodiments, aperture 340 is utilized to introduce fluid or solution into baffle cavity 330. In various embodiments, a fitting or coupling is provided in aperture 340 and, as shown in FIGS. 10 and 14, may be utilized to operatively couple a pump 360 to baffle cavity 330.

More specifically, in various embodiments, pump 360 or more than one pump may optionally be provided (see FIGS. 10 and 14) to help introduce fluid or solution into baffle cavity 330. Pump 360 may also be used, for example, to help introduce fluid or solution into the inner box or structure, for circulation or recirculation, etc.

One or more apertures may be provided in the sidewalls, and/or bottom of the inner structure or box. The aperture(s) may be adapted to receive a fitting, such as for connection to a pipe, tube or other plumbing for the transfer of fluid into or out of the inner box.

Referring to FIGS. 11-14, inner structure or box 300 includes, receives, or carries one or more electrode structural support members 370. In various embodiments, multiple electrode structural support members 370 are spaced apart in inner box or structure 300. In one or more examples of embodiments, each electrode structural support member 370 is sized to span the width of inner box 300. However, one or more electrode structural support members may extend less than the full width of inner box 300 or inner box cavity. In various embodiments, one or more electrode structural members 370 are sized to extend the depth of inner box 300 or inner box cavity, or a portion thereof.

In various embodiments, one or more apertures 380 are defined by and spaced apart proximate to a side or outer edge of electrode structural support members 370. In particular, in the illustrated examples, apertures 380 are spaced apart between the top and bottom of electrode structural support member 370 near an edge of electrode structural support member 370. When electrode structural support members 370 are provided in or otherwise in position in inner box 300, apertures 380 permit fluid flow through structural support member 370 and between adjacent cavities or cells 390 formed between respective electrode structural support members 370 and electrodes (see arrow 395 on FIG. 15 for an example serpentine, sinuous or winding flow pattern). In various embodiments and as shown in FIG. 11, apertures 380 also permit the passage of fluid or solution into, through, or out of inner box 300 on an approximate side portion of inner box 300.

Depending upon the application or desired flow rate, apertures 380 of electrode structural support members may be sized larger, smaller, relatively differently, etc. Further, apertures 380 allow flow even when electrode structural support members 370 extend full width of inner box 300, or the inner box cavity.

In one or more examples of embodiments, the apparatus is provided with a fluid flow path that facilitates or operates as a venturi system. In other words, in various embodiments, the cross-sectional area of the fluid flow path is adjusted to control the velocity of the fluid (which increases as the cross sectional area decreases), and the static pressure (which correspondingly decreases with cross-sectional area decrease). As a result, in examples of embodiments, less standing fluid, (e.g. water) is required for the system to operate.

Figure 11:
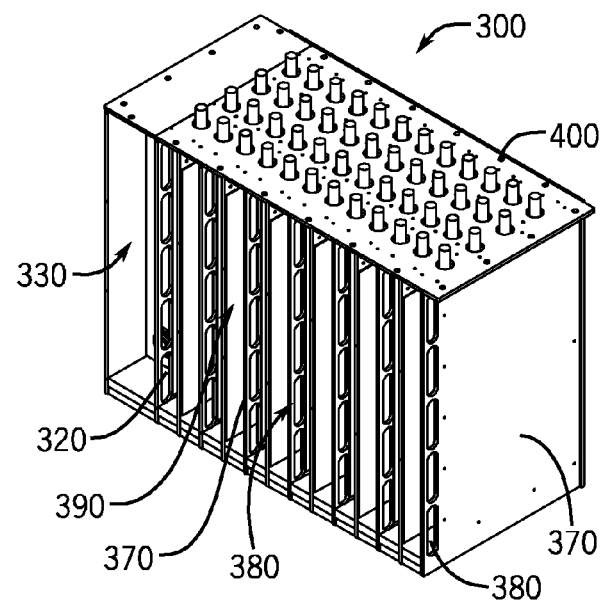
FIG. 11 is a partially broken isometric view of the inner box or system of a PECO device illustrated in FIG. 10, according to one or more examples of embodiments.
Figure 12:
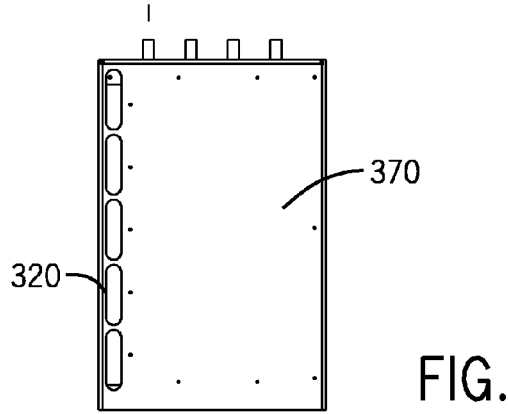
FIG. 12 is an end view of the inner box or structure of a PECO device illustrated in FIG. 10, according to one or more examples of embodiments.

As can be seen in FIG. 11, in various embodiments, a plurality of electrode structural support members 370 are provided, arranged or positioned in inner box or structure 300 in an alternating pattern such that adjacent electrode structural support members 370 are provided with apertures 380 which are not aligned, and more preferably on, proximate to or adjacent opposite edges or sides (e.g. in a mirror image pattern), such that fluid or solution may flow through the respective apertures and/or inner box 300 in a serpentine or undulating pattern.

In this arrangement according to various embodiments, respective electrodes and terminals (as will be described in greater detail below) on adjacent electrode structural support members 370 are also offset from one another, alternating in being spaced from opposite sides of inner box 300. Further, adjacent electrode structural support members 370 (and facing photoelectrodes as discussed in greater detail below) form a cavity or cell 390 therebetween. In various embodiments, the plurality of electrode structural support members 370 in inner box 300 helps form a plurality of cells 390 (e.g. interconnected cells) operatively or otherwise connected in series by apertures 380 in electrode structural support members 370.

One or more or the electrode structural support members may include multiple joined segments or portions. In various embodiments, the electrodes are supported on a first segment or portion of the electrode structural support member, which portion is coupled to an adjacent segment or portion defining or having a plurality of apertures. In various embodiments, one or more electrode structural support members 370 are a single piece of material or layers of material(s).

Referring to FIG. 13, in various embodiments, inner box or structure 300 includes a bottom or partition to promote flow from inlet to outlet. In various embodiments, a "false" bottom or other lower partition is provided near the bottom of at least a portion of inner box or structure 300 such that the bottom of inner box 300 near the inlet is relatively higher than bottom of inner box near the outlet.

Figure 15:
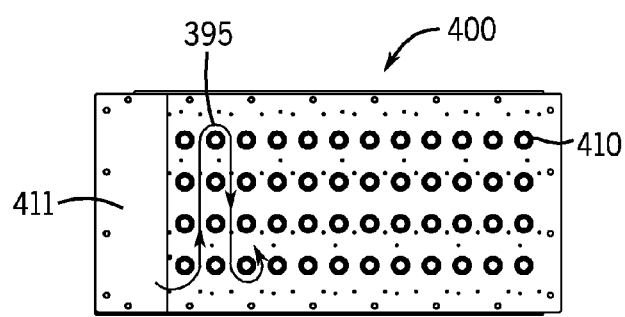
FIG. 15 is a top view of an inner box or structure of a PECO device, according to one or more examples of embodiments.

Referring to FIG. 15, in various embodiments, inner box 300 is provided with an inner box cover or lid 400. The inner box cover or lid may be separable or partially separable from the inner box. In various embodiments, inner box cover or lid 400 is sized and/or shaped to cover the opening, or a portion of the opening, formed by the top of inner box 300 sidewalls or cavity. Inner box lid 400 may be formed of any suitable material or materials. For example, inner box lid 400 may be formed of the same material as the inner box, or may be formed of an alternative material or materials. In various embodiments, inner box cover 400 includes a pump access panel 411. In various embodiments, pump access panel 411 helps improve access to one or more components (e.g. pump) housed within the inner box and/or baffle cavity.

As shown in FIGS. 11 and 15, in various embodiments, inner box lid 400 defines or includes a plurality of apertures 410 (e.g. rows of apertures). In various embodiments, one or more apertures 410 are adapted to removably receive one or more UV lamp or UV-light assemblies or black light assemblies (for ease of reference hereinafter, UV-light and black light will be referred to as UV-light or like designations, but corresponding descriptions may apply equally to either light source). In one or more examples of embodiments, apertures 410 defined by inner box lid 400 are generally aligned (e.g. longitudinally) with the cells formed between the adjacent electrode structural support members (or electrodes) such that, as shown in FIG. 13, each UV-light assembly provided in each aperture 410 extends into the cavity or cell between or formed at least in part by, facing electrodes or electrode assemblies. In addition, inner box lid 400 may include one or more apertures or slots adapted to receive terminals extending from or otherwise electrically coupled to the electrodes.

Referring to FIGS. 13 and 15, apertures 410 defined by or provided in the inner box lid 400 may receive one or more UV-light sources or assemblies. The UV lights may be oriented (e.g. vertically) between the electrode structural support members or the photoelectrodes forming each cell. In one or more examples of embodiments, one or more apertures 410 receives a sleeve, casing, or other housing 415 which may help carry or secure a UV-light source to or relative to lid 400. In various embodiments, each sleeve, casing, or housing 415 is sealed to lid 400. In one or more further examples, cable glands may be used to help hold (e.g. relative to the inner box lid) the sleeves that house or are adapted to house, at least in part, UV bulbs or UV-light sources. In various embodiments, sleeve 415 is formed of any material suitable for the purposes provided. In one or more examples of embodiments, sleeve 415 is a quartz sleeve. In various embodiments, the sleeve may be UV-transparent material, such as, but not limited to, plastic or glass. Alternatively, a UV light source, assembly or bulb may be used or provided without the sleeve.

In various embodiments, a UV-light bulb is provided into an aperture in sleeve 415 and/or inner box lid 410. In various embodiments, a light source assembly (e.g. UV light source) is provided. In one or more examples of embodiments, a light source assembly includes a lamp or bulb and a transparent quartz or fused silica member adapted to house the lamp. In one or more examples of embodiments, the UV light bulb is a high irradiance UV light bulb. In one or more further examples of embodiments, the UV bulb is a germicidal UV bulb with a light emission in the range of 400 nanometers or less. In various examples of embodiments, the UV bulb is a germicidal UV bulb with a light emission in the range of 250 nanometers to 400 nanometers. In various embodiments, the UV source and/or sleeve extends a distance into the cell in the inner box, such that the UV is exposed to the electrodes, illuminating some or all of the surfaces thereof according to the embodiments described herein. In various embodiments, sleeve 415 extends at least from inner box lid 400 to at least the bottom of cell 390 (e.g. to or through partition or "false" bottom). This is advantageous in that the configuration adds structure and rigidity to the inner box. One example of a distribution of UV lamps is illustrated in FIGS. 11, 13 and 15.

In various embodiments, the ultraviolet light has a wavelength in the range of about 185-380 nm. In one or more examples of embodiments, the lamp is a low pressure mercury vapor lamp adapted to emit UV germicidal irradiation at 254 nm wavelength. In one or more alternative examples of embodiments, a UV bulb with a wavelength of 185 nm may be effectively used. In one or more additional examples of embodiments, the lamp is adapted to emit an irradiation intensity in the range of 1-500 mW/cm$^2$. The irradiation intensity may vary considerably depending on the type of lamp used. Higher intensities may improve the performance of the photoelectrocatalytic oxidation (PECO) device. However, the intensity may be so high that the system is swamped and no further benefit is obtained. That optimum irradiation value or intensity may depend, at least in part, upon the distance between the lamp and the photoelectrode.

Various UV light sources, such as germicidal UVC wavelengths (peak at 254 nm) and black-light UVA wavelengths (UVA range of 300-400 nm), may also be utilized. In one or more examples of embodiments, the optimal light wavelength (e.g. for promoting oxidation) is 305 nm. However, various near-UV wavelengths are also effective. Both types of lamps may emit radiation at wavelengths that activate photoelectrocatalysis. The germicidal UV and black light lamps are widely available and may be used in commercial applications of the instant PECO device.

The intensity (i.e., irradiance) of UV light at the photoelectrode may be measured using a photometer available from International Light Technologies Inc. (Peabody, Mass.), e.g., Model IL 1400A, equipped with a suitable probe. An example irradiation is greater than 3 m Wcm$^2$.

UV lamps typically have a "burn-in" period. UV lamps may also have a limited life (e.g., in the range of approximately 6,000 to 10,000 hours). UV lamps also typically lose irradiance (e.g., 10 to 40% of their initial lamp irradiance) over the lifetime of the lamp. Thus, it may be important to consider the effectiveness of new and old UV lamps in designing and maintaining oxidation values.

In one or more examples of embodiments, the light source assembly is disposed exterior to the housing member, and the housing member includes a transparent or translucent member adapted to permit ultraviolet light emitted from the light source assembly to irradiate the photoelectrode. The device may also function using sunlight instead of, or in addition to, the light source assembly.

Accordingly, a plurality of UV bulbs are inserted into the inner box lid and/or sleeves and may be secured in position. The UV bulbs are further connected to a source of power. In the examples illustrated in the Figures, the bulbs are connected via one or more cables or wires to one or more ballasts.

A power supply may also be provided in the panel for supplying power to the UV lamps. The power supply, or an alternative power supply, may also be provided in the panel for providing an applied voltage to the electrodes. In one or more examples of embodiments, increasing the applied voltage may increase photocurrent and chlorine production. The power supply may be an AC or DC power supply and may include a plurality of outputs. In one or more examples of embodiments, the power supply is a DC power supply. The power supply may be a mountable power supply which may be mounted to the panel. Preferably, the power supply is small in size, is durable or rugged, and provides power sufficient to operate the plurality of UV-lamps operated by the apparatus and/or to supply the applied voltage to the electrodes according to the previously described methods. Power supplies acceptable for use with the apparatus described herein are commonly commercially available from companies such as Automation Direct (Cumming, Ga.) under the RHINO PSS™ trademark, such as a panel mount power supply.

The power supply may be connected to the UV-lamps through electrical connection with the ballasts. To this end, the power supply may be connected to the ballasts via one or more terminal blocks. The power supply or an additional power supply may be connected to the terminals of the anodes and cathodes described hereinabove via, for example cable connection to the terminals, for providing a current or charge to the electrodes as described in the foregoing discussed methods.

Referring again to FIG. 1, in various embodiments, ballasts 419 help stabilize the current through an electrical load. Each ballast 419 may provide a positive resistance or reactance that limits the final current to an appropriate level. In this way, each ballast 419 may provide for the proper operation of a negative-resistance device by appearing to be a legitimate, stable resistance in the circuit. Accordingly, in various embodiments, ballasts 419 are utilized or used to help regulate the flow of current and to provide adequate voltage for the UV-lights or lamps improve function or otherwise to function properly. Advantageously, in various embodiments, ballasts 419 help control the amount of current drawn, and/or reduce the likelihood of overheating and burnout of the lamps.

In one or more examples of embodiments, ballasts 419 work as follows. When a UV light or lamp is switched on, ballast 419 may supply a high voltage briefly to establish an arc between two electrodes of the UV bulb or lamp. Once the arc is initiated, ballast 419 may promptly lower the voltage and start to regulate the electric current, maintaining a steady light output. The durability of lamps often depends on maintaining an optimum temperature in the electrodes powering the lamp. Accordingly, in one or more examples of embodiments, ballasts 419 may utilize or use a circuit (e.g. an independent circuit) that heats the lamp electrodes using a low voltage. This temperature control during lamp starting and operation elongates lamp life.

The ballasts may also be adaptable ballasts. An adaptable ballast uses modified circuitry that enables it to operate different lamp types and numbers of lamps in a range of input voltages. Different manufacturers may specialize in different types of adaptable ballasts, and ballasts suitable for use with the intended purposes of the PECO device described herein may be obtained via common commercial means.

According to one or more examples of embodiments as shown in FIG. 1, a plurality of ballasts 419 (e.g. electronic ballasts) adapted for use with UV lamps are provided for use with the apparatus and system. In various embodiments, ballasts 419 are electrically coupled or connected to internal components (e.g. one or more UV lamps of bulbs) of the PECO unit. In one or more examples of embodiments, ballasts 419 are connected by wire, or cable, to respective UV lamps carried by the inner box lid, apertures defined therein, and/or sleeves provided therein. In various embodiments, ballasts 419 are connected to the cable or wire by one or more terminal blocks which provide a means of connecting the individual electrical wires for each UV lamp. Any terminal block suitable for connecting the ballast to the UV lamp may be acceptable for the purposes provided. Terminal blocks are commonly commercially available from companies such as Automation Direct (Cumming, Ga.).

While specific examples are illustrated including a plurality of ballasts for use with a plurality of UV bulbs, a single ballast may be provided for use with multiple UV bulbs.

Ballasts 419 and/or any ballast supports may be coupled, connected or secured to the container, and in particular provided in electrical enclosure 230 coupled to the exterior of container 140. In one or more alternative examples of embodiments, as shown in FIG. 1, ballasts are secured in electrical enclosure 230 in a row or plurality of rows. Ballasts 419 may be mounted directly to electrical enclosure 230, or may be mounted to a plate which is secured to container 140 or to electrical enclosure 230. In various embodiments, the ballasts are provided in a stacked arrangement in which a first plurality of ballasts are positioned on a ballast support above a second plurality of ballasts.

Figure 17:
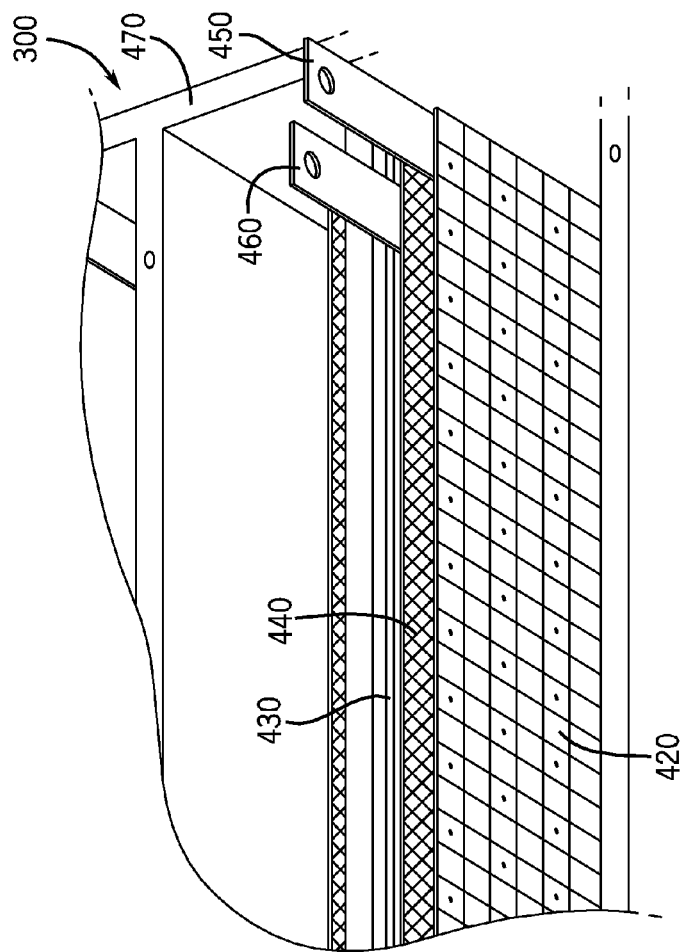
FIG. 17 is a fragmentary view of an inner box or structure of a PECO device according to one or more examples of embodiments.
Figure 16:
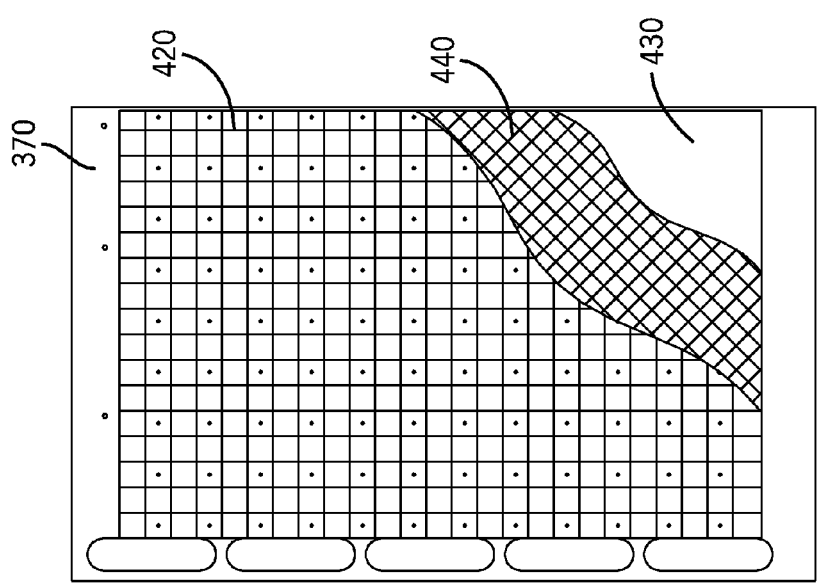
FIG. 16 is a partially broken view of an electrode structural support member including a photoelectrode, counterelectrode and separator of the inner box or structure of a PECO device, according to one or more examples of embodiments.

As shown in FIGS. 16 and 17, in various embodiments, one or more electrodes 420/430 are provided on, and/or, or may be supported by, electrode structural support member 370. In various embodiments, electrodes 420/430 are supported on one face or both opposing faces of various electrode structural support members 370. For example, a photoelectrode (e.g. anode) 420, counter electrode (e.g. cathode) 430, and separator 440 may be coupled to electrode structural support member 370 by an attachment mechanism, such as but not limited to, a plastic or non-conductive screw or rivet. The electrodes 420/430 may extend the depth of the inner box cavity, or a portion thereof.

In various embodiments, the electrodes 420/430 include one or more photoelectrodes (e.g. anodes) 420, and one or more counterelectrodes (e.g. cathodes) 430. As can be seen by reference to the Figures, in various embodiments, each electrode 420/430 is formed of a sheet of material, or plurality of (e.g., interconnected or adjoining) sheets of material. In one or more examples of embodiments, the distance between electrodes is minimized while preventing shorting between the photoelectrode (e.g. anode) 420 and a counterelectrode (e.g. cathode) 430. As can be seen in FIGS. 16 & 17, in various embodiments, the photoelectrode (e.g. anode) 420 and counter electrode (e.g. cathode) 430 are separated by a separator 440. Separator 440 may be used or otherwise provided to prevent shorting. In one or more examples of embodiments, photoelectrode (e.g. anode) 420 and counterelectrode (e.g. cathode) 430 are separated by a plastic mesh separator 440, although alternative separators (e.g. those accomplishing or tending to accomplish the same or similar purposes) may be acceptable for use with the device and system described herein. In the illustrated examples, and example embodiments, counterelectrode (e.g. cathode) 430 is placed or otherwise provided "behind" the photoelectrode (e.g. anode) 420 relative to a UV light source (not shown) (i.e., between electrode structure support member 270 and photoelectrode 420). In various embodiments, photoelectrode or anode 420 is corrugated and/or defined or includes a plurality of holes punched therein. As a result of the holes, the positioning, etc., the photoelectrode may help create turbulence in fluid flowing in the system. Additionally, one or more holes may allow oxidants generated or produced on or near a surface of photoelectrode 420 to more rapidly and effectively make their way into or otherwise reach or react with the fluid (e.g., aqueous solution) and/or contaminants therein.

Positioning of the photoelectrode and counterelectrode in relation to the relative surface area may be of importance in one or more examples of embodiments. For instance, a smaller surface area photoelectrode positioned relatively closer to UV light may generate more photocurrent and chlorine than a larger surface area photoelectrode positioned relatively farther from UV light. Centering of the anode may also be helpful in optimizing or maximizing productivity. Likewise, multiple photoelectrodes may be utilized to improve photocurrent, oxidation, and chlorine generation.

Referring to FIG. 17, in various embodiments, terminals 450/460 are respectively electrically coupled (e.g. attached) to counterelectrode/cathode 430 and photoelectrode/anode 420, forming a respective positive terminal 450 and negative terminal 460. Terminals 450/460 are formed of a conductive material, such as a conductive metal. In various embodiments, terminals 450/460 of respective cathodes and anodes, which are spaced by a separator, are provided or positioned in close proximity to each other. In various embodiments, terminals 450/460 include a portion that extends beyond or above counterelectrode (e.g. cathode) 430 and photoelectrode (e.g. anode) 420, and further extends beyond or above an upper edge 470 of inner box or structure 300. One or more terminals may define or be provided with an aperture for ease of connection or coupling of the terminal to a wire, electrical cable or the like.

In one or more examples of alternative embodiments, the plurality of structural support members having the electrodes thereon may be provided in a cascading tray system, which may comprise flat trays stacked one on top of another, with UV light sources positioned between said trays, such that water cascades from one level to the next in alternating directions.

In various embodiments, photoelectrode 420 includes a conductive support member and a film member. In one or more examples of embodiments, the conductive support member is constructed from metal (e.g. titanium). In various embodiments, the film member is nanoporous and includes a thin layer (e.g., 200-500 nm) of a titanium dioxide ($TiO_2$) that is provided or adapted to function as a photocatalyst. In various examples of embodiments, the film member has an average thickness in the range of 1-2000 nanometers. In one or more examples of embodiments, the film member has an average thickness in the range of 5 to 500 nanometers.

In various embodiments, the film member is provided on (e.g., coated on or adhered to) the conductive support member. In various embodiments, the film member has a median pore diameter in the range of 0.1-500 nanometers constructed from $TiO_2$ nanoparticles. In one or more examples of embodiments, the median pore diameter of the film member is in the range of 0.3-25 nanometers. In other examples of embodiments, the median pore diameter of the film member is in the range of 0.3-10 nanometers.

In various examples of embodiments, the film member is constructed from a stable, dispersed suspension comprising $TiO_2$ nanoparticles having a median primary particle diameter in the range of 1-50 nanometers. The nanoporous film may also be deposited by other methods, such as plasma, chemical vapor deposition or electrochemical oxidation. In one or more examples of embodiments, the $TiO_2$ nanoparticles have a median primary particle diameter in the range of 0.3-5 nanometers.

In various embodiments, the film member is constructed from a stable, dispersed suspension including a doping agent. Examples of suitable doping agents include, but are not limited to, Pt, Ni, Au, V, Sc, Y, Nb, Ta, Fe, Mn, Co, Ru, Rh, P, N and/or carbon.

In various examples of embodiments, the nanoporous film member is constructed by applying a stable, dispersed suspension having TiO$_2$ nanoparticles suspended therein. In various embodiments, the TiO$_2$ nanoparticles are sintered at a temperature in the range of 300 deg C. to 1000 deg C. for 0.5 to 24 hours. Example photoelectrodes may be prepared by coating Ti metal foil. One example of suitable Ti metal foil includes 15 cm×15 cm×0.050 mm thickness and 99.6+% (by weight) pure Ti metal foil commercially available from Goodfellow Corp. (Oakdale, Pa.) with a titania-based metal oxide. In various embodiments, the Ti metal foil is cleaned with a detergent solution, rinsed with deionized water, rinsed with acetone, and/or heat-treated at 350 deg C. for 4 hours providing an annealed Ti foil Annealing may also be conducted at higher temperatures such as 500 deg C.

Following cleaning and/or pretreatment, in various embodiments, the metal foil may be dip-coated. For example, the metal foil may be dip-coated three to five times with an aqueous suspension of titania at a withdrawal rate of ~3.0 mm/sec. After each application of coating, in various embodiments, the coated foil is air dried for about 10-15 min and then heated in an oven at 70 deg C. to 100 deg C. for about 45 min. After applying a final coating, in various embodiments, the coated foil is sintered at 300-500 deg C. (e.g., 300 deg C., 400 deg C. or 500 deg C.) for 4 hours at a 3 deg C./min ramp rate. The Ti foil may be dipped into suspensions of titania synthesized using methods disclosed in U.S. patent application Ser. Nos. 11/932,741 and 11/932,519, each of which is incorporated herein by reference in its entirety. In various embodiments, the optimized withdrawal speed is around 21.5 cm min$^{-1}$.

Titanium foil is stable and may also be used to make photoelectrodes.

In addition, in one or more examples of embodiments of the photoelectrode, the stable, dispersed suspension is made by reacting titanium isopropoxide and nitric acid in the presence of ultrapure water or water purified by reverse osmosis, ion exchange, and one or more carbon columns. In various embodiments, the conductive support member is annealed titanium foil. Other conductive supports may be employed, such as conductive carbon or glass. In various other embodiments, the photoelectrode is constructed from an anatase polymorph of Ti or a rutile polymorph of Ti. In one or more examples of embodiments of the photoelectrode, the rutile polymorph of Ti is constructed by heating an anatase polymorph of Ti at a temperature in the range of 300 deg C. to 1000 deg C. for a sufficient time. In one or more examples of embodiments of the photoelectrode, the anatase polymorph of Ti is heated at 500 deg C. to 600 deg C. to produce the rutile polymorph of Ti.

In various embodiments, after the titanium support is provided with a layer or film of TiO$_2$, the composite electrode is air-heated at a high temperature, giving the nanoporous TiO$_2$ film a crystalline structure due to thermal oxidation. It is believed that the instant titania, when heated at 500 deg C., converts to a crystalline rutile polymorph structure. It is further believed that the instant TiO$_2$ heated at 300 deg C. converts to a crystalline anatase polymorph structure. In some PECO applications, rutile TiO$_2$ has substantially higher catalytic activity than the anatase TiO$_2$. Rutile TiO$_2$ may also have substantially higher catalytic activity with respect to certain contaminant such as ammonia.

In various embodiments, photoelectrode 420 is modified (e.g. to improve performance). In various embodiments, such modifications include holes or perforations made or provided in photoelectrode 420, conductive support member or foil. In various embodiments, the holes or perforations are made at regular intervals (e.g., 0.5 to 3 cm spacing between the holes). In various embodiments, such modifications also include corrugating or otherwise modifying the photoelectrode, conductive support member or foil to produce a wave-like pattern (e.g., regular wave-like pattern) on the foil surface. In various embodiments, the height of a corrugation "wave" is 1-5 mm. For example, in various embodiments, corrugating the foil twice at right angles to each other produces a unique cross-hatched pattern on the foil surface. In one or more examples of embodiments, Ti mesh (e.g., 40×40 twill weave, 60×60 dutch weave, etc.) may be used for making a photoelectrode (e.g., anode).

Modifications of the photoelectrode may also include various microfeatures and/or microstructures. Accordingly to various embodiments, the modifications of the photoelectrode, conductive support member or foil may also include various microfeatures and/or microstructures that increase the relative surface area of the photoelectrode and/or increase or promote turbulence about the photoelectrode. For example, according to various embodiments, such microfeatures and/or microstructures include those that are disclosed in U.S. Patent Publication Nos. 20100319183 and 20110089604, each of which is incorporated herein by reference in its entirety, or such microfeatures and/or microstructures that are provided commercially from Hoowaki, LLC (Pendleton, S.C.). In various embodiments, the microfeatures may include microholes.

In one or more examples of embodiments, counterelectrode or cathode 430 is constructed from or includes Al, Pt, Ti, Ni, Au, stainless steel, carbon and/or another conductive metal. In one or more examples of embodiments, counterelectrode 430 is in the form of a foil. However, the counterelectrode may alternatively be in the form or shape of a wire, plate or cylinder.

One or more power supplies, in one or more examples of embodiments, may be connected to a power switch for activating or deactivating the supply of power. In one or more further examples of embodiments, a power supply, UV lamps, and or electrodes, may be connected to or in communication with programmable logic controller or other control or computer for selectively distributing power to the UV lamps and/or to the electrodes, including anodes and cathodes described herein.

In various embodiments, the PECO device may also include a potentiostat, and a reference electrode in electrical communication with the potentiostat. In one or more examples of embodiments, the device further comprises a reference electrode and a voltage control device, such as a potentiostat, adapted to maintain a constant voltage or constant current between the reference electrode and the photoelectrode. In various embodiments, the housing member is adapted to house the reference electrode.

In one or more examples of embodiments, the device further comprises a semi-micro saline bridge member connecting the potentiostat and reference electrode, whereby the housing member is adapted to house the saline bridge.

In one or more examples of embodiments, the reference electrode is constructed from silver and is in the shape of a wire.

In one or more examples of embodiments, the potential on the photoelectrode is held constant relative to a saturated calomel reference electrode by potentiostat, such as EG&G Model 6310. In various embodiments, the potentiostat is connected to the reference electrode through a semi-micro saline bridge, such as available from EG&G, Model K0065. The saline bridge may be disposed inside the reactor close to photoelectrode. The current passing through the PECO device may be measured.

In various embodiments, the instant potentiostat is a variable current source that can measure a voltage between two electrodes. The potentiostat can perform a wide variety of electrochemical functions, but the two example functional modes are constant current and constant voltage. In constant current mode, the potentiostat supplies a user specified or predetermined current to the electrodes. In constant voltage mode, it supplies current to the electrodes while monitoring the voltage. It can then continually adjust the current such that the voltage will remain constant at a user specified value. A potentiostat can also be configured to supply pulses.

A temperature probe(s) may also be provided in one or more examples of embodiments. The temperature probe(s) may be positioned in the container and/or in the inner box. The temperature probe may monitor the temperature in the container or in the box or in the fluid within the respective container or box and communicate that temperature reading. Further the temperature probe may be in communication with a shut-off switch or valve which is adapted to shut the system down upon reaching a predetermined temperature.

A fluid level sensor(s) may also be provided which may communicate a fluid level reading. The fluid level sensor(s) may be positioned in the container and/or in the inner box. Further the fluid level sensor may be in communication with a shut-off switch or valve which is adapted to shut off the intake of fluid or engage or increase the outflow of fluid from the container upon reaching a predetermined fluid value.

In one or more examples of embodiments, the device includes a carbon filter adapted to filter chlorine from the water. In various embodiments, the device includes a computer adapted to send one or more controlled signals to the existing power supplies to pulse the voltage and current.

In operation of the foregoing example embodiment, contaminated fluid, such as contaminated water, may be pumped or otherwise directed into the container and circulated into and through the series of cells, which may be in the inner box. In various embodiments, the contaminated water flows through the series of cells, from one cell to the next, in a serpentine or undulating pattern and is processed via the powered electrodes and light assemblies according to the methods described herein. The maximum fluid level in the container and/or the inner box may be just below the upper edge of the respective container or box, although alternative fluid levels would not depart from the overall scope of the present invention. The water may be circulated and/or recirculated within the inner box or container. Multiple units, or reactors, may be connected and operated in series, which may result in increased space and time for contaminated fluid in the reactor(s). Upon completion of processing, in various embodiments, the water exits the inner box and container ready for use.

In various embodiments, in operation, the $TiO_2$ photocatalyst is illuminated with light having sufficient near UV energy to generate reactive electrons and holes promoting oxidation of compounds on the anode surface.

Any temperature of liquid water is suitable for use with the instant PECO device. In various embodiments, the water is sufficiently low in turbidity to permit sufficient UV light to illuminate the photoelectrode.

In various embodiments, photocatalytic efficiency is improved by applying a potential (i.e., bias) across the photoelectrode and counterelectrode. Applying a potential may decrease the recombination rate of photogenerated electrons and holes. In various embodiments, an effective voltage range applied may be in the range of −1 V to +15 V. In various embodiments, an electrical power source is adapted to apply an electrical potential in the range of 4 V to 12 V across the photoelectrode and counterelectrode. In various embodiments, the electrical power source is adapted to generate an electrical potential in the range of 1.2 V to 3.5 V across the photoelectrode and counterelectrode (or, 0 to 2.3 V vs. the reference electrode).

For various applications, including, for example fracking fluid or high-salinity applications, it may be desirable to reverse (e.g., periodically or intermittently) the potential, bias, polarity and/or current applied to or between the photoelectrode and the counterelectrode (e.g., to clean the photoelectrode and/or counterelectrode, or to otherwise improve the performance of the photoelectrode, counterelectrode, or PECO device). In various embodiments, by reversing the potential, bias, polarity and/or current, the photoelectrode is changed (e.g. from an anode) into a cathode and the counterelectrode is changed (e.g. from a cathode) into an anode.

For example, in various embodiments, initially positive voltage is electrically connected to a positive charge electrode and negative voltage is electrically connected to a negative charge electrode. After a first period of time, the positive voltage is electrically connected to the negative charge electrode and the negative voltage is electrically connected to the positive charge electrode. After a second period of time, the positive voltage is electrically connected back to the positive charge electrode and the negative voltage is electrically connected back to the negative charge electrode. This reversal process may be repeated as necessary or desired.

The length of the first period of time and the second period of time may be the same. In various embodiments, however, the length of the first period of time and the second period of time are different. In various embodiments, the first period of time is longer than the second period of time.

The length of the first and second periods of time depends on a variety of factors including salinity, application, voltage, etc. For example, fracking fluid or high salinity fluid applications may require relatively more frequent reversal of potential, bias, polarity and/or current compared to fresh water applications. In various embodiments, the lengths of the first period of time relative to the second period of time may be in a ratio of from 3:1 to 50:1, and in one or more further embodiments from 3:1 to 25:1, and in one or more further embodiments from 3:1 to 7:1. For example, in various embodiments, the first period of time and second period of time is about 5 minutes to about 1 minute. Fresh water applications may require relatively less frequent reversal of potential, bias, polarity and/or current, and the lengths of the first period of time relative to the second period of time may be in a ratio of from 100:1 to 10:1. For example, in various embodiments, the first period of time and second period of time is about 60 minutes to a range of about 1 minute to about 5 minutes.

In various embodiments, the voltage applied between the photoelectrode and counterelectrode may not change during the first period of time of normal potential and during the second period of time of reverse potential. For example, in various embodiments (e.g, where the photoelectrode includes titanium and the apparatus and/or method are adapted for treatment of fracking or other high salinity solution) the voltage applied during the first period of time may be less than 9V (e.g., about 7.5V) and the voltage applied during the second period of time may be less than 9V (e.g., about 7.5V). In other various embodiments (e.g, where the photoelectrode includes titanium and the apparatus and/or method are adapted for treatment of fresh water) the voltage applied during the first period of time may be greater than 9V (e.g., about 12V) and the voltage applied during the second period of time may be greater than 9V (e.g., about 12V).

Maintaining the voltage in the first period of time and the second period of time may help to un-foul the photoelectrode to help make it more effective for removing contaminants through photoelectrocatalytic oxidation during the first period of time. However, maintaining the voltage under 9V in each period of time may cause a momentary disturbance in the removal of contaminants during the second period of time. For a variety of reasons, (e.g., to help minimize any such disturbance and/or to help cause electroprecipitation and/or electrocoagulation), in various embodiments, it may be advantageous to apply higher voltages (e.g. voltages greater than 9V) during the first period of time and second period of time. In various embodiments, applying higher voltages helps to promote an electrochemical process such as electroprecipitation and/or electrocoagulation during the second period of time, which process can help minimize any disturbance in removal of contaminants during the second period of time as well as offer advantages and benefits of such a process.

In various embodiments, the voltage is adjusted to control the rate of dissolution of the electrode. In various examples of embodiments, the voltage applied during the first period of time may be more than 9V (e.g., about 12V) and the voltage applied during the second period of time may be more than 9V (e.g., about 12V). Higher voltages may help optimize the effectiveness of the PECO device in certain ways. Higher voltages may also lead to electroprecipitation or electrocoagulation of contaminants within or from the fluid. However, such higher voltages may also lead to anodic dissolution such as pitting and other degradation of the photoelectrode and/or counterelectrode, which may necessitate more frequent servicing of the PECO device (e.g. replacement of the photoelectrode (e.g., the foil) and counterelectrode).

In various embodiments, it may be advantageous (e.g., to help limit any anodic dissolution, or pitting or other degradation of the photoelectrode) to apply relatively lower voltages during the first period of time and relatively higher voltages during the second period of time. In various embodiments, e.g., in a fracking fluid application using a photoelectrode and a counterelectrode including titanium, the voltage applied during the first period of time may be less than 9V (e.g., about 7.5V) and the voltage applied during the second period of time may be more than 9V (e.g., about 12V for fracking fluid or higher salinity applications, to about 14V for fresh water applications). In various embodiments, during application of relatively lower voltage during the first period of time, contaminants are degraded (or the removal of contaminants is promoted) by photoelectrocatalytic oxidation, and during application of a relatively higher voltage during the second period of time, contaminants are degraded (or the removal of contaminants is promoted) by an electrochemical process such as electroprecipitation and/or electrocoagulation.

In various embodiments, during the second period of time, the counterelectrode or sacrificial electrode of titanium is dissolved at least in part by anodic dissolution. It is believed that a range of coagulant species of hydroxides are formed (e.g. by electrolytic oxidation of the sacrificial counterelectrode), which hydroxides help destabilize and coagulate the suspended particles or precipitate and/or adsorb dissolved contaminants.

In various embodiments, it is advantageous to apply relatively higher voltages during the first period of time and relatively lower voltages during the second period of time. In various embodiments, the voltage applied during the first period of time is more than 9V (e.g., about 12V) and the voltage applied during the second period of time is less than 9V (e.g., about 7.5V).

In various embodiments, the main reaction occurring at the counterelectrodes or sacrificial electrodes during the second period of time (e.g., during polarity reversal) is dissolution:

$$Ti_{(s)} \rightarrow Ti^{4+} + 4e^-$$

In addition, water is electrolyzed at the counterelectrode (or sacrificial electrode) and photoelectrode:

$$2H_2O + 2e^- \rightarrow H_{2(g)} + 2OH^- \quad \text{(cathodic reaction)}$$

$$2H_2O \rightarrow 4H^+ + O_{2(g)} + 4e^- \quad \text{(anodic reaction)}$$

In various embodiments, electrochemical reduction of metal cations ($Me^{n+}$) occurs at the photoelectrode surface:

$$Me^{n+} + ne^- \rightarrow nMe^o$$

Higher oxidized metal compounds (e.g., Cr(VI)) may also be reduced (e.g. to Cr(III)) about the photoelectrode:

$$Cr_2O_7^{2-} + 6e^- + 7H_2O \rightarrow 2Cr^{3+} + 14OH^-$$

In various embodiments, hydroxide ions formed at the photoelectrode increase the pH of the solution which induces precipitation of metal ions as corresponding hydroxides and co-precipitation with metal (e.g. Ti) hydroxides:

$$Me^{n+} + nOH^- \rightarrow Me(OH)_{n(s)}$$

In addition, anodic metal ions and hydroxide ions generated react in the solution to form various hydroxides and built up polymers:

$$Ti^{4+} + 4OH^- \rightarrow Ti(OH)_{4(s)}$$

$$nTi(OH)_{4(s)} \rightarrow Ti_n(OH)_{4n(s)}$$

However, depending on the pH of the solution other ionic species may also be present. The suspended titanium hydroxides can help remove pollutants from the solution by sorption, co-precipitation or electrostatic attraction, and coagulation. For a particular electrical current flow in an electrolytic cell, the mass of metal (e.g. Ti) theoretically dissolved from the counterelectrode or sacrificial electrode is quantified by Faraday's law $$m = \frac{ItM}{zF}$$

where m is the amount of counterelectrode or sacrificial electrode material dissolved (g), I the current (A), t the electrolysis time (s), M the specific molecular weight (g mol$^{-1}$), z the number of electrons involved in the reaction and F is the Faraday's constant (96485.34 As mol$^{-1}$). The mass of evolved hydrogen and formed hydroxyl ions may also be calculated.

In various embodiments, it may be advantageous (e.g., to help limit any anodic dissolution, or pitting or other degradation of the photoelectrode) to apply certain voltages (e.g., relatively higher voltages) during the first period of time and different voltages (e.g., relatively lower voltages) during the second period of time. In various embodiments (e.g., in a fracking fluid application using a counterelectrode including aluminum), the voltage applied during the first period of time may be about 6V to 9V (e.g., about 7.5V) and the voltage applied during the second period of time may be about 0.6V-12V. In various embodiments, during application of relatively higher voltage during the first period of time, contaminants are degraded (or the removal of contaminants is promoted) by photoelectrocatalytic oxidation, and during application of a relatively lower voltage during the second period of time, contaminants are degraded (or the removal of contaminants is promoted) by and electrochemical process such electroprecipitation or electrocoagulation.

In various embodiments, during the second period of time, an aluminum counterelectrode or sacrificial electrode is dissolved at least in part by anodic dissolution. It is believed that a range of coagulant species of hydroxides are formed (e.g. by electrolytic oxidation of the sacrificial counterelectrode), which hydroxides help destabilize and coagulate the suspended particles or precipitate and/or adsorb dissolved contaminants.

In various embodiments, the main reaction occurring at the counterelectrodes or sacrificial electrodes during the second period of time (e.g., during polarity reversal) is dissolution:

$$Al_{(s)} \rightarrow Al^{3+} + 3e^-$$

Additionally, water is electrolyzed at the counterelectrode (or sacrificial electrode) and photoelectrode:

$$2H_2O + 2e^- \rightarrow H_{2(g)} + 2OH^- \quad \text{(cathodic reaction)}$$

$$2H_2O \rightarrow 4H^+ + O_{2(g)} + 4e^- \quad \text{(anodic reaction)}$$

In various embodiments, electrochemical reduction of metal cations ($Me^{n+}$) occurs at the photoelectrode surface:

$$Me^{n+} + ne^- \rightarrow nMe^o$$

Higher oxidized metal compounds (e.g., Cr(VI)) may also be reduced (e.g. to Cr(III)) about the photoelectrode:

$$Cr_2O_7^{2-} + 6e^- + 7H_2O \rightarrow 2Cr^{3+} + 14OH^-$$

In various embodiments, hydroxide ions formed at the photoelectrode increase the pH of the solution which induces precipitation of metal ions as corresponding hydroxides and co-precipitation with metal (e.g. Al) hydroxides:

$$Me^{n+} + nOH^- \rightarrow Me(OH)_{n(s)}$$

In addition, anodic metal ions and hydroxide ions generated react in the solution to form various hydroxides and built up polymers:

$$Al^{3+} + 3OH^- \rightarrow Al(OH)_{3(s)}$$

$$nAl(OH)_{3(s)}^- \rightarrow Al_n(OH)_{3n(s)}$$

However, depending on the pH of the solution other ionic species, such as dissolved $Al(OH)^{2+}$, $Al_2(OH)_2^{4+}$ and $Al(OH)_4^-$ hydroxo complexes may also be present. The suspended aluminum hydroxides can help remove pollutants from the solution by sorption, co-precipitation or electrostatic attraction, and coagulation.

For a particular electrical current flow in an electrolytic cell, the mass of metal (e.g. Al) theoretically dissolved from the counterelectrode or sacrificial electrode is quantified by Faraday's law $$m = \frac{ItM}{zF}$$

where m is the amount of counterelectrode or sacrificial electrode material dissolved (g), I the current (A), t the electrolysis time (s), M the specific molecular weight (g mol$^{-1}$), z the number of electrons involved in the reaction and F is the Faraday's constant (96485.34 As mol$^{-1}$). The mass of evolved hydrogen and formed hydroxyl ions may also be calculated.

The present invention, in one or more examples of embodiments, is directed to methods of treating an aqueous solution having one or more contaminants therein to help remove or reduce the amounts of contaminants. In various embodiments, the method includes providing an aqueous solution comprising at least one contaminant selected from the group consisting of an organism, an organic chemical, an inorganic chemical, and combinations thereof and exposing the aqueous solution to photoelectrocatalytic oxidization.

In one example of an application of the device described herein, the device uses photoelectrocatalysis as a treatment method for fracking fluid. While typically described herein as reducing or removing contaminants from fracking fluid, it should be understood by one skilled in the art that photoelectrocatalysis of other contaminants can be performed similarly using the photoelectrocatalytic oxidation or PECO device.

Generally, the method for reducing amount of contaminants in solution or fluid described includes introducing the solution into a housing or container or cell including: a UV light; a photoelectrode, wherein the photoelectrode comprises an anatase polymorph of titanium, a rutile polymorph of titanium, or a nanoporous film of titanium dioxide; and a cathode. The photoelectrode is irradiated with UV light, and a first potential is applied to the photoelectrode and counterelectrode for a first period of time. A second potential is applied to the photoelectrode and counterelectrode for a second period of time. As a result, the contaminant amount in solution is reduced.

In various embodiments, one or more contaminants are oxidized by a free radical produced by a photoelectrode, and wherein one or more contaminants are altered electrochemically (e.g. by electroprecipitation or electrocoagulation). In various embodiments, one or more contaminants are oxidized by a chlorine atom produced by a photoelectrode. In various embodiments, one or more contaminants are altered electrochemically (e.g. by electroprecipitation or electrocoagulation).

The instant apparatus and methods utilizes photoelectrocatalytic oxidation, whereby a photocatalytic anode is combined with a counterelectrode to form an electrolytic cell. When the instant anode is illuminated by UV light, its surface becomes highly oxidative. By controlling variables including, without limitation, chloride concentration, light intensity, pH and applied potential, the irradiated and biased $TiO_2$ composite photoelectrode selectively oxidizes contaminants that come into contact with the surface, forming less harmful gas or other compounds. Application of a potential to the photoelectrode provides further control over the oxidation products. Periodic or intermittent reversal of the potential helps further remove or reduce the amount of contaminants.

The foregoing apparatus and method provides various advantages. The device may be provided in a portable container, permitting on-site water or fluid decontamination. Further, the device is modular in design and can be easily increased or decreased in size as needed. The device is also easy to fabricate and includes electrical connections which are easy to make. UV lights illuminate anodes on both sides (e.g. internal sides) of the individual cells, advantageously and effectively doubling anode surface area illuminated by each bulb, as well as reducing the number of UV bulbs required and the corresponding power and electrical connections required to operate the bulbs. In the apparatus described, the cathode is positioned behind the anode and away from the scouring action of water flow, reducing or limiting scale accumulation. Additionally, the spacer positioned between the cathode and anode reduces shorting caused by contact of the cathode and anode. These and other advantages are apparent from the foregoing description and associated Figures.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

We claim:

1. An apparatus for removing or reducing the level of contaminants in a solution comprising:
   a structure, the structure comprising a first sidewall and a second sidewall, a structure cover, and spaced-apart electrode structural support members extending between the first sidewall and the second sidewall;
   the structure cover defining apertures with sleeves provided therein that extend into a space between the spaced-apart electrode structural support members;
   the spaced-apart electrode structural support members each having at least one photoelectrode and at least one counterelectrode provided thereon;
   wherein the photoelectrode comprises a primarily titanium foil support with a layer of titanium dioxide provided thereon; and
   wherein the photoelectrode and counterelectrode are each coupled to a respective terminal adapted to be electrically coupled to a power supply.

2. The apparatus of claim 1, wherein each of the spaced-apart electrode structural support members defines at least one aperture near an edge of the electrode structural support member.

3. The apparatus of claim 2, wherein at least two spaced-apart electrode structural support members are provided such that respective apertures of the spaced-apart electrode structural support members are not aligned.

4. The apparatus of claim 1, wherein a UV light source is provided in each sleeve.

5. The apparatus of claim 4, wherein at least one of the UV light sources is electrically coupled to a ballast.

6. The apparatus of claim 1, wherein multiple photoelectrodes are provided on at least one of the spaced-apart electrode structural support members.

7. The apparatus of claim 6, wherein multiple counterelectrodes are provided on at least one of the spaced-apart electrode structural support members.

8. An apparatus for removing or reducing the level of contaminants in a solution comprising:
   a structure comprising a sidewall, and a structure cover and spaced-apart electrode structural support members extending from the sidewall to form a cell between the spaced-apart electrode structural support members;
   the structure cover defining apertures with sleeves provided therein that extend from the structure cover into the cell formed between the spaced-apart electrode structural support members;
   the spaced-apart electrode structural support members each having a photoelectrode and counterelectrode provided thereon with a separator provided between the photoelectrode and counterelectrode;
   wherein the photoelectrode comprises a primarily titanium foil support with a layer of titanium dioxide provided thereon; and
   wherein the photoelectrode and counterelectrode are each coupled to a terminal adapted to be electrically coupled to a power supply.

9. The apparatus of claim 8, wherein each spaced-apart electrode structural support member defines at least one aperture near an edge of the electrode structural support member.

10. The apparatus of claim 9, wherein the spaced-apart electrode structural support members are provided such that respective apertures of the spaced-apart electrode structural support members are not aligned.

11. The apparatus of claim 8, wherein a UV light source is provided in each sleeve.

12. The apparatus of claim 11, wherein at least one of the UV light sources is electrically coupled to a ballast.

13. The apparatus of claim 8, wherein multiple photoelectrodes are provided on at least one of the spaced-apart electrode structural support members.

14. The apparatus of claim 13, wherein multiple counterelectrodes are provided on at least one of the spaced-apart electrode structural support members.

15. An apparatus for removing or reducing the level of contaminants in a solution comprising:
- a structure, the structure comprising a first set of opposing members coupled to a second set of opposing members, and spaced-apart electrode structural support members extending between the first and second set of opposing members;
- the spaced-apart electrode structural support members each having a photoelectrode and counterelectrode provided thereon;
- wherein each of the opposing members of the first set of opposing members define apertures with sleeves provided therein, which sleeves extend at least from one opposing member of the first set of opposing structure members to another opposing member of the first set of opposing members into a space between the spaced-apart electrode structural support members;
- wherein the photoelectrode comprises a primarily titanium foil support with a layer of titanium dioxide provided thereon; and
- wherein the photoelectrode and counterelectrode are each coupled to a terminal adapted to be electrically coupled to a power supply.

16. The apparatus of claim 15, wherein each spaced-apart electrode structural support member defines at least one aperture near an edge of the spaced-apart electrode structural support member.

17. The apparatus of claim 16, wherein at least two spaced-apart electrode structural support members are provided such that apertures of the spaced-apart electrode structural support members are not aligned.

18. The apparatus of claim 15, wherein a UV light source is provided in each sleeve.

19. The apparatus of claim 15, wherein multiple photoelectrodes are provided on at least one of the spaced-apart electrode structural support members.

20. The apparatus of claim 19, wherein multiple counterelectrodes are provided on at least one of the spaced-apart electrode structural support members.

* * * * *